United States Patent
Arao

[19]

[11] Patent Number: 5,831,970
[45] Date of Patent: Nov. 3, 1998

[54] TRANSMISSION APPARATUS

[75] Inventor: Hideaki Arao, Kawasaki, Japan

[73] Assignee: Fujitsu Limited, Kanagawa, Japan

[21] Appl. No.: 861,609

[22] Filed: May 22, 1997

[30] Foreign Application Priority Data

Dec. 13, 1996 [JP] Japan ................................. 8-333259

[51] Int. Cl.⁶ ..................................................... H04L 1/22
[52] U.S. Cl. ......................... 370/227; 370/244; 370/395
[58] Field of Search ................................. 370/355, 356, 370/360, 366, 367, 217–228, 242, 244, 248, 346, 395; 340/825.01, 825.08; 371/20.6

[56] References Cited

U.S. PATENT DOCUMENTS

| | | | |
|---|---|---|---|
| 4,680,776 | 7/1987 | Ikeuchi et al. | 370/228 |
| 5,212,474 | 5/1993 | Thoma | 370/228 |
| 5,285,441 | 2/1994 | Bansal et al. | 370/218 |
| 5,577,096 | 11/1996 | Kitano et al. | 379/2 |
| 5,663,949 | 9/1997 | Ishibashi et al. | 370/220 |
| 5,712,847 | 1/1998 | Hata | 370/228 |
| 5,740,157 | 4/1998 | Demiray et al. | 370/219 |

FOREIGN PATENT DOCUMENTS 4-119036   4/1992   Japan.

*Primary Examiner*—Chau Nguyen
*Assistant Examiner*—Ken Vanderpuye
*Attorney, Agent, or Firm*—Helfgott & Karas, P C.

[57] ABSTRACT

A transmission apparatus comprises a main signal line block for transmitting a main signal and a monitor/control block for monitoring state of the apparatus and lines by collecting line switching information supplied from each unit which constitutes the main signal line block and controlling the switching operation between a working line and a protection line. The main signal line block and the monitor/control block are connected by an ATM link. An ATM routing unit in the main signal line block collects line switching information supplied from each unit and maps the line switching information in data portion of an ATM cell and transmits the ATM cell to the monitor/control block via the ATM link.

6 Claims, 27 Drawing Sheets

| RMV  | UNIT MISSING |
| ---- | ------------ |
| FUSE | FUSE DOWN |
| PWR  | Power Module Down |
| EQPT | OSCILLATOR TROUBLE |
| SF   | DETECT SIGNAL FAIL (TRANSMISSION LINE TROUBLE) |
| SD   | DETECT SIGNAL DEGRADE (QUALITY DEGRADATION) |

FIG.5

| | | | | | | | | |
|---|---|---|---|---|---|---|---|---|
| 5 | Header | | | | | | | |
| | RMV | FUSE | PWR | EQPT | | | SF-R | SD-R | Unit #1
| | RMV | FUSE | PWR | EQPT | | | SF-R | SD-R | Unit #2
| | RMV | FUSE | PWR | EQPT | | | SF-R | SD-R | Unit #3
| 32 | RMV | FUSE | PWR | EQPT | | | SF-R | SD-R | Unit #16
| | RMV | FUSE1 | FUSE2 | | FAN1 | FAN2 | | | Unit #17
| | RMV | FUSE1 | FUSE2 | | FAN1 | FAN2 | | | Unit #18
| 14 | Reserve | | | | | | | |
| 2 | STATUS / CRC | | | | | | | |

FIG.24 (PRIOR ART)

| BIT | |
|---|---|
| $b_1 \sim b_4$ | • NULL WHEN RECEIVED K1 BYTE IS NULL CHANNEL (0)<br>• CHANNEL NUMBER BRIDGED FOR SAKE OF PROTECTION IN OTHER CASES |
| $b_5$ | • "1" · · · 1 + 1 NETWORK<br>• "0" · · · 1 : N NETWORK |
| $b_6 \sim b_8$ | • "101" · · · BIDIRECTIONAL SWITCHING<br>• "100" · · · UNIDIRECTIONAL SWITCHING<br>• "011"<br>  "010"  } · · 1 : n D/I (DROP/INSERT) PROTECTION SWITCHING<br>  "001"<br>• "111" · · · AIS (Alame Indication Signal)<br>• "110" · · · FERF (Far End Receive Failure) |

TRANSMISSION APPARATUS

BACKGROUND OF THE INVENTION

The present invention relates to a transmission apparatus and, more particularly, to a transmission apparatus provided with a main signal line block for transmitting a main signal and a monitor/control block for monitoring the state of the apparatus and the lines by collecting line switching information supplied from each unit which constitutes the main signal line block and controlling the switching operation between a working line and a protection line.

(a) Shelf

Several basic shelves are prepared, the shelves are assembled to construct a terminal station, a repeater station and a signal regenerator, and these are used to construct an optical transmission system.

FIG. 14 is a diagram illustrating an HS (high-speed) shelf, and FIG. 15 is a diagram illustrating a TRIB (tributary) shelf. An HS shelf 150 has line-optical interfaces 151, 152 for interfacing OC-48 (2.4 Ghz) optical transmission lines, a switch 153, and a tributary-side interface 154. The line-optical interfaces 151, 152 respectively have O/E converters 151a, 152a for converting optical signals to electric signals, E/O converters 151b, 152b for converting electric signals to optical signals, demultiplexers (DMUX) 151c, 152c for demultiplexing a higher-order group signal (an OC-48 optical signal) into three types of signals STS-1, STS-3C, STS-12c, and multiplexers 151d, 152d for multiplexing the signals STS-1, STS-3C, STS-12c. The switch 153 has a function for passing the three types of signals demultiplexed by the demultiplexers 151c, 152c or for dropping these signals on the tributary side. Further, the switch 153 switches the signals STS-1, STS-3C, STS-12c, which have been inserted from the tributary side, to the E (East) or W (West) direction.

An HS shelf 160 has interfaces 161, 162 for lower-order group signals (DS3×12ch, STS-1×12ch, OC-3/3c×2ch, OC-12/12C×1ch), a switch 163 and an interface 164 for interfacing the HS shelf. The tributary-side interfaces 161, 162 respectively have multiplexer/demultiplexers (MUX/DMUX) 161a, 162a for multiplexing the lower-order group signals to signals STS-1, STS-3C, STS-12c, entering these signals into the switch 163, demultiplexing signals that have entered from the switch 163 and then outputting these signals, and interfaces 161b, 162b for interfacing multiplexers located within station.

(b) LTE, LNR ADM, REG

By combining the HS shelf 150 and TRIB shelf 160, it is possible to construct an LTE (line terminal equipment), which serves as a terminal station for an optical transmission line, as shown in FIGS. 16A, 16B, or an LNR ADM (linear add/drop multiplexer), which serves as a repeater station (D/I: drop/insert), as shown in FIG. 16C. In the LTEs illustrated in FIGS. 16A, 16B, only the line-optical interface on one side of the HS shelf is used.

(c) Construction of Transmission System

A point-to-point optical transmission system can be constructed by using the LTEs, arranged as set forth above, as terminal stations (station A and station B) of an OS-48 optical transmission line, as illustrated in FIG. 17. Further, a ring system (not drawn) can be constructed by connecting LNR ADMs in a ring-shaped configuration. Furthermore, a linear ADM system can be constructed by using the LTEs as terminal stations (station A and C) and using the LNR ADM as a repeater (station B), as depicted in FIG. 18.

Further, as shown in FIG. 19, a 1+1 line switching point-to-point system can be constructed by adding 2.4 G switch controllers (2.4 G SW CONT) onto a 1+1 arrangement having one working line WORK1 and one protection (standby) line PTCT. Similarly, as shown in FIG. 20, a 1:N line switching point-to-point system can be constructed by adding 2.4 G switch controllers (2.4 G SW CONT) onto a 1:N arrangement having N-number of working lines WORK1~WORKN and one protection line PTCT.

(d) Changeover of Optical Signal Line

In the 1:N line switching point-to-point system, the sending and receiving of information relating to switching of the OC-48 optical signal line is performed using K1/K2 bytes of overhead bytes stipulated by a SONET (synchronous optical network) standard, which is in line with the new synchronous network standard of North America.

(d-1) Frame format

FIG. 21A is a diagram for describing the frame format of a SONET STS-3(OC-3). One frame consists of 9×270 bytes. The first 9×9 bytes constitute section overhead (SOH), and the remaining bytes constitute path overhead (POH) and payload (PL). Section overhead is for transmitting information (a frame synchronizing signal) representing the beginning of the frame, information specific to the transmission line (information for checking error at the time of transmission, information for maintaining the network, etc.), and a pointer indicating the position of the path overhead POH. Further, the path overhead POH is for transmitting information for end-to-end monitoring within the network, and the payload PL is for transmitting 150 Mbps information.

The section overhead SOH is composed of repeater section overhead of 3×9 bytes, a pointer of 1×9 bytes and multiplex section overhead of 5×9 bytes. The repeater section overhead has bytes A1~A2, C1, B1, E1, F1 and D1 D3, as shown in FIG. 21B. The multiplexer section overhead has bytes B2, K1~K2, D4~D12 and Z1~Z2. The repeater section overhead and multiplexer section overhead have a number of undefined bytes and use thereof is left to the communications manufacturer.

FIG. 22 is a diagram for describing the SONET OC-12 frame format produced by multiplexing SONET OC-3 frames. The frame is composed of section overhead SOH of 9×9×4 bytes, path overhead POH of 9×4 bytes and a payload PL of 9×260×4 bytes. A SONET OC-48 frame is similarly constructed.

Among the overhead bytes, the K1 byte is used mainly to request switching and designates the level of the switching request and the line switched. The K2 byte is used mainly to respond to the K1 byte. In addition, this is used to express the system architecture, the switching mode and AIS/FERF (AIS: alarm indication signal; FERF: far end receive failure). Switching requests include, in addition to the switching request at the time of signal failure, switching requests based upon lock-out, a forced switch and a manual switch. FIGS. 23 and 24 illustrate the arrangement of the K1/K2 bytes stipulated by the SONET standard, as well as a list of the meanings of the bytes.

(d-2) K1 byte

The first four bits b1~b4 of the K1 byte represent a switching request, and the last four bits b5~b8 represent a switching line. A maximum of 14 transmission lines can be designated. "Lockout of Projection" is a switching request which inhibits switching to a protection transmission line. "Forced Switch" is an artificial switching request for a designated transmission line. If a changeover has been made, no changeover is made to any other line that has failed. "SF" (signal failure) is a switching request for when a signal on a transmission line has been lost. This request has two priorities, namely high and low. "SD" (signal degrade) is a switching request in response to deterioration of a signal on a transmission line and has the two priorities high and low. It should be noted that the SF switching request has a higher priority than the SD switching request. "Manual Switch" is an artificial switching request. When a failure has occurred elsewhere, priority is given to changeover of this switch. "Wait-to-Restore" is a request which, if a request for switching back has been issued after restoration of a failed line, performs switch-back upon elapse of a prescribed period of time. "Exercise" is a request for automatically diagnosing, by actually performing switching, whether the switching operation has been performed normally. "No Request" is sent when operation is normal or when a bridge is removed.

Switch-back modes that can be set are of two types, namely a non-revertive mode in which, if a fault that caused switching has been eliminated, the line to which the changeover has been made is kept as is and is not switched back, and a revertive mode in which the line to which the changeover has been made is switched back to the original line. The former is used mainly in case of the 1+1 arrangement and the latter in case of the 1:N arrangement. The revertive mode has the WTR (wait to restore) function. Specifically, after the cause of switching is eliminated, switch-back is performed not immediately but upon elapse of a specific period of time. This is a function which prevents noisy switching and is stipulated as being between 5 and 12 minutes according to the SONET standard.

In a case where there is contention for a protection line at the time of switching, priority is given to the switching request having the higher level. Further, two degrees of priority (LOW/HIGH) can be set for each line. In a case where switching requests have the same level, the line having the higher degree of priority is switched. In a case where switching requests have the same level and the degrees of priority of the lines are also the same, the line that issued the switching request first is switched. In a case where the levels of the switching requests, the degrees of priority of the lines and the timings at which the switching requests were issued are the same, the line having the youngest line number is given precedence in changeover. This is the order of priority stipulated by the SONET standard. However, there are cases where other orders of priority are requested depending upon the customer.

(d-3) K2 byte

Bits b1~b4 of the K2 byte designate the number of the transmission line. These bits are nulled (0000) in a case where the bits b5~b8 of the received K1 byte are null and become the number of the transmission line switched in other cases. The b5 bit indicates the network construction; a "1" indicates the 1+1 system and a "0" indicates the 1:N system. The bits b6~b8 indicate the particular switching mode, the details of a failure, etc. There are two types of switching modes, namely a unidirectional mode in which only a unidirectional signal is switched, and a bidirectional mode in which signals in two directions are switched simultaneously.

(d-4) Switching sequence using K1, K2 bytes

In the unidirectional mode, the B station sends the K1 byte (switch request) to the A station upon detecting SF (signal failure), as shown in FIG. 24A. The A station performs bridge control with respect to the line designated by the K1 byte (switch request) received. Bridge control refers to control for sending identical signals to both the working line and the protection line. After performing bridge control, the A station sends the B station the K2 byte (switch response) corresponding to the K1 byte received. Upon receiving the K2 byte, the B station performs switch control. Switch control means control in which the line signal of the designated reception direction is changed over to the protection line.

In the bidirectional mode, the B station sends the K1 byte (switch request) to the A station upon detecting SF, as shown in FIG. 25B. The A station performs bridge control with respect to the line designated by the K1 byte (switch request) received, sends back the K2 byte (switch response) in the same manner as in the unidirectional mode, and simultaneously sends a K1 byte designating a reverse request (RR). Upon receiving the RR, the B station performs switch control and bridge control with respect to the line designated by the K1 byte which is itself sent, and sends the K2 byte (switch response) to the A station. Upon receiving the K2 byte (switch response), the A station performs switch control.

(e) Line switching control of 1:N point to point system (e-1) HS shelf

In FIG. 14, only a main signal system of HS shelf (high speed shelf) is shown. Actually, in addition to the main signal system, a monitoring control unit and a line switching control unit exist. FIG. 26 shows the construction of an HS shelf having all the units.

An HS shelf 150 is provided with an HT2H unit 1 (OC-48 optical transmission unit) and an HR2H unit 2 (OC-48 optical reception unit) which serve as optical signal interfaces. The HT2H unit 1 converts OC-48 optical signals to STS-48 electric signals and the HR2H unit 2 converts STS-48 electric signals to OC-48 optical signals. The HT2H unit 1 (OC-48 optical transmission unit) and the HR2H unit 2 (OC-48 optical reception unit) are respectively inserted to the east (EAST) and west (WEST) directions.

An HM2H unit 3 is used for multiplexing/demultiplexing STS-48 electric signals. In a case where the HS shelf is used for a LTE (line terminal equipment) or an LNR ADM (linear add/drop multiplexer), the unit 3 multiplexes four STS-12C electric signals input from low order group shelves to generate STS-48 electric signals and reversely, demultiplexes STS-48 electric signals to generate four STS-12C electric signals. Further, the HM2H unit 3 has a TSA function (time slot assignment function) and two units 3 are provided redundantly for each HS shelf 150. FIG. 27 is a diagram showing the connection among the HT2H unit 1, HR2H unit 2 and the HM2H units 3 having redundant construction in which "WORK" means a working system and "PTCT" means a protection (standby) system.

In addition to the above-mentioned units, the HS shelf includes a PW2H unit 4 serving as a power-supply unit, an AW2H unit 5 having an alarm function and the like order wire function, an SV2H unit 6 having a function for collecting information such as line condition, unit condition and the like inside the shelf and a function for interfacing an external monitoring device, an MP2H unit 7 which administers monitoring and control functions inside the shelf, and an HS2H unit [overhead byte processor (OHB processor)] 8 for controlling line switching of the OC-48 signal and for processing the OHB of the OC-48 signal.

FIG. 28 is a diagram for showing a slot position of each unit in the HS-shelf and the TRIB-shelf. The TRIB-shelf consists of two systems (Group 1, Group 2) in which PW is a power-supply unit, MP is a control unit for collecting information inside the shelf and executing control in the shelf, DS is a converting unit for converting serial signals (OC-12 optical signals) to parallel signals and vice versa, HCs are units provided redundantly for interfacing the HS shelf and for multiplexing/demultiplexing and HS is a unit for controlling an overhead bytes and switching the HC units. P or PTCT means a protection (standby) system and W or WORK means a working system.

(e-2) First method of line switching

FIG. 29 is a diagram for describing line switching control (first method) in a 1:N point-to-point system. Shown in FIG. 29 are the first working terminal stations $11_1 \sim 11_{N'}$ the first protection terminal station $110$, the second working terminal stations $21_1 \sim 21_{N'}$ the second protection terminal station $21_0$, the signal regenerators (REG) $31_0 \sim 31_{N'}$ overhead processors $41_0 \sim 41_{N'}$ $42_0 \sim 42_{N'}$ control signal lines $81 \sim 82$, photocouplers PC, optical fibers LF, the protection optical transmission line (protection line) PTCT and the N-number of working optical signal lines (working lines) WK1~WKN. In FIG. 10, N=2 holds.

The overhead processor $42_1$ of the working terminal station $21_1$ that has detected the occurrence of a failure (the "x" mark) in the optical transmission line WK1 sends the K1 byte (Switch Request) to the overhead processor $42_0$ of the protection terminal station $21_0$ via the control line 82. The overhead processor $42_0$ sends the K1 byte to the overhead processor $41_0$ of the protection terminal station $11_0$ via the protection line PTCT. As a result, the overhead processor $41_0$ enters the K1 byte into the opposing working terminal station $11_1$ via the control line 81.

Upon receiving the K1 byte, the overhead processor $41_1$ of the opposing working terminal station $11_1$ performs bridge control, and the overhead processors $41_0$, $42_0$ of the protection terminal stations $11_0$, $21_0$ change over switches (not shown) to connect the protection transmission line PTCT. The overhead processor $41_1$ of the working terminal station $11_1$ thenceforth sends the K2 byte (Switch Response) to the working terminal station $21_1$ through a path which is the reverse of the foregoing. In response to the K2 byte, the overhead processor $42_1$ of the working terminal station $21_1$ performs switch control to switch the failed transmission line WK1 over to the protection transmission line PTCT, after which the working terminal station $21_1$ receives the OC-48 optical signal through the path indicated by the dashed line. If this arrangement is adopted, it is possible to switch lines using the K1/K2 bytes in a 1:N line switching point-to-point optical transmission system.

(e-3) Second method

FIG. 30 is a diagram for describing line switching control (second method) in a 1:N point-to-point system according to the present invention. Components identical with those shown in FIG. 29 are designated by like reference characters. FIG. 30 differs from FIG. 29 in that (1) an automatic protection switching controller (APS CONT) 61 having line switching function is provided to correspond to (n+1)-number of terminal stations $11_0 \sim 11_n$, (2) an automatic protection switching controller (APS CONT) 62 is provided to (n+1)-number of terminal stations $21_0 \sim 21_n$, and (3) terminal devices (CID) 91, 92 are connected to the automatic protection switching controllers 61, 62, respectively.

The automatic protection switching controllers (APS CONT) 61, 62 perform control to switch a faulty transmission line to the protection transmission line by executing processing in accordance with a protocol which uses K1, K2 bytes contained in the overhead. The terminal devices (CID) 91, 92 are for entering and designating various data.

The overhead processor $42_1$ of the working terminal station $21_1$ that has detected the occurrence of a failure (the "x" mark) in the optical transmission line WK1 notifies the automatic protection switching controller (APS CONT) 62 of the content of the failure and the line number via the control line 82. As a result, the automatic protection switching controller 62 instructs the OHB processor $42_0$ of the protection terminal station $21_0$ to send the K1 byte (Switch Request) to the protection terminal station $11_0$. The OHB processor $42_0$ creates the K1 byte and sends it to the protection terminal station $11_0$. Upon receiving the K1 byte, the OHB processor $41_0$ of the protection terminal station $11_0$ so notifies the automatic protection switching controller 61. When the K1 byte has been received, the automatic protection switching controller 61 instructs the opposing station $11_1$ of the working terminal station $21_1$, via the control line 81, to perform bridge control, in response to which the working terminal station $11_1$ performs bridge control. Further, the automatic protection switching controllers 61, 62 instruct the OHB processors $41_0$, $42_0$ of the protection terminal stations $11_0$, $21_0$ to perform switching, in response to which the OHB processors $41_0$, $42_0$ effect the connection of the protection transmission line PTCT.

The overhead processor $41_1$ of the working terminal station $11_1$ thenceforth sends the K2 byte (Switch Response) to the working terminal station $21_1$ through a path which is the reverse of the foregoing. In response to the K2 byte, the overhead processor $42_1$ of the working terminal station $21_1$ performs switch control to switch the failed transmission line WK1 over to the protection transmission line PTCT, after which the working terminal station $21_1$ receives the OC-48 optical signal through the path indicated by the dashed line. If this arrangement is adopted, it is possible to switch lines using the K1/K2 bytes in a 1:N line switching point-to-point optical transmission system.

(f) Collection of line switching information

When the transmission apparatus judges that it is necessary to switch the lines on the basis of the report from the monitoring device, the working line is switched over to the protection line, as described above. In order to judge whether or not switching is necessary, the monitor/control unit (MP2H unit) collects line switching information from each unit in the shelf, and if it is judged that the line switching operation is necessary, the monitor/control unit instructs the OHB processing/line switching unit (HS2H unit) to switch the working line over to the protection line.

FIG. 31 is a block diagram of the process of collection information and switching the lines in a conventional transmission system. The transmission system is composed of, for example, terminal stations or repeater stations as units (see FIGS. 19, 20). The reference numerals $91a$ to $91n$ represent shelves (such as an HS shelf and a TRIB shelf). Each shelf is separated into (1) a main signal line group $91a_1$ to $91n_1$ which is composed of units for transmitting a main signal and (2) a line monitor/control group $91a_2$ to $91n_2$ which is composed of units for monitoring the state of the apparatus and the lines by collecting line switching information supplied from each unit which constitutes the main signal line block $91a_1$ to $91n_1$, and controlling the switching operation between a working line and a protection line. In the case of the HS shelf (FIG. 26), the main signal line group $91a_1$ to $91n_1$ includes HT2H unit, HR2H unit, HM2H unit, HS2H unit, etc. and the line monitor/control group $91a_2$ to $91n_2$ includes MP2H unit (control/monitor unit), SV2H unit (interface unit for collecting information), etc. which have the structure of a processor. The reference numeral 92 represents a processor for collecting the state of the apparatus and the lines supplied from each line monitor/control group $91a_2$ to $91n_2$ so as to monitor and control the transmission system as a whole. Each line monitor/control group $91a_2$ to $91n_2$ and the processor 92 constitute a distributed processing system.

The main signal line groups $91a_1$ to $91n_1$ constitute a main signal line block 93 and the line monitor/control groups $91a_2$ to $91n_2$ constitute a monitor/control block 94.

Line switching is necessary, for example, when a unit is removed, when a fuse is blown, when there is a trouble in the power source module of a unit, when there is a trouble in the oscillator of a unit, when there is a trouble SF (signal fail) in a transmission line and when there is a quality degradation SD (signal degrade). Each unit which constitutes the main signal line group $91a_1$ to $91n_1$ is provided with a detector for detecting such an event which necessitates the change of line. Each unit which constitutes the main signal line group $91a_1$ to $91n_1$ is connected to an information collecting interface unit of the corresponding line monitor/control group $91a_2$ to $91n_2$ by a data bus. The information collecting interface unit (SV2H unit) of the line monitor/control group $91a_2$ to $91n_2$ accesses each unit in the corresponding main signal line group $91a_1$ to $91n_1$ and reads and collects line switching information directly from the internal register of the unit. The monitor/control unit (MP2H unit) judges whether or not there is an event which necessitates the change of line, and if the answer is in the affirmative, it instructs the line switching unit in the corresponding main signal line group $91a_1$ to $91n_1$ to change the line via the control data bus. Data buses are distributed on the back board of the shelf.

According to the conventional method described above, as the line capacity increases, the number of groups contained in the main signal line block 93 and the number of units contained in each group increase. As a result, there are a problem of a pin neck caused by the increase of the I/Os and a problem of a multilayer back board caused by the increase of the number of line switching signal lines (data buses) in the information collecting interface unit of the line monitor/control group $91a_2$ to $91n_2$. In addition, the wiring operation disadvantageously becomes complicated. Furthermore, since the load of the CPU increases with the increase in the number of units, there is a limitation in the software processing.

SUMMARY OF THE INVENTION

Accordingly, it is a first object of the present invention to eliminate the above-described problems in the related art and to prevent an increase in the number of signal lines even if the number of groups contained in the main signal line block or the number of units contained in each group increases, to prevent the back board from being layered and to improve the wiring operability.

It is a second object of the present invention to lighten the burden of software processing imposed on a processor of a monitor/control block by collecting line switching information from a main signal line block at a high speed via an ATM link, thereby enabling the processor to switch the lines at a high speed.

It is a third object of the present invention to enable high-speed mapping processing for mapping line switching information in an ATM cell by serially transmitting the line switching information collected from each unit in the main signal line block to an ATM mapping portion.

It is a fourth object of the present invention to enable ATM cells to be correctly transmitted and received between the ATM mapping portion and an ATM cell transmitter in accordance with start-stop synchronization.

It is a fifth object of the present invention to enable the monitor/control block to transmit and receive desired information (unit state data, unit identification data, line switching control data, etc.) via each unit and an ATM link.

To achieve the first and second objects, a transmission apparatus according to the present invention comprises: a main signal line block; and a monitor/control block connected to the main signal line block by an ATM link; wherein the main signal line block includes a line switching information collecting portion for collecting line switching information supplied from each unit, and an ATM cell transmitter and receiver for transmitting an ATM cell in which the line switching information is mapped to the monitor/control block via the ATM link and receiving an ATM cell which is transmitted from the monitor/control block; and the monitor/control block includes an ATM cell transmitter and receiver for receiving an ATM cell which is transmitted from the main signal line block and transmitting an ATM cell in which predetermined information is mapped to the main signal line block via the ATM link.

To achieve the third object, in a transmission apparatus according to the present invention, the main signal line block is provided with an ATM mapping portion for generating an ATM cell by mapping line switching information in the data field of the ATM cell and transmitting the ATM cell to the ATM cell transmitter and receiver, and the line switching information collecting portion transmits the collected line switching information to the ATM mapping portion as serial data.

To achieve the fourth object, in a transmission apparatus according to the present invention, a start bit, a stop bit and a parity bit are attached to an ATM cell, and the ATM cell is transmitted and received between the ATM mapping portion and the ATM routing portion in accordance with start-stop synchronization.

To achieve the fifth object, in a transmission apparatus according to the present invention, the monitor/control block transmits a polling cell having a VCI value which specifies a unit to the main signal line block, the ATM routing portion of the main signal line block routes the received polling cell to the ATM mapping portion in the unit designated by the VCI value, and the ATM mapping portion transmits the information required by the polling cell to the monitor/control block in the form of an ATM cell via the ATM routing portion.

Other features and advantages of the present invention will be apparent from the following description taken in conjunction with the accompanying drawings.

BRIEF DESCRIPTION OF THE DRAWINGS

FIG. 5 shows the format of an alarm transmission ATM cell;

FIG. 24 is an explanatory view of a K2 byte;

DESCRIPTION OF THE PREFERRED EMBODIMENTS (A) Transmission apparatus of the present invention FIG. 1 shows the structure of a transmission apparatus according to the present invention. The transmission apparatus is composed of, for example, terminal stations or repeater stations as units. The reference numeral 100 represents a main signal line block, 200 a monitor/control block for (1) monitoring the state of the apparatus and the lines by collecting line switching information supplied from each unit of the main signal line block and (2) instructing the switching operation between a working line and a protection line, and $300_1$ to $300_n$ ATM links for connecting the main signal line block 100 and the monitor/control block 200.

In the main signal line block 100, the reference numerals 101a to 101n denote ATM routing units for transmitting and receiving an ATM cell between the main signal line block 100 and the monitor/control block 200, and 102a to 102n main signal line groups each of which is composed of units for transmitting a main signal. The ATM routing units 101a is connected to each unit which constitutes the main signal line group 102a by a plurality of signal lines for transmitting and receiving line switching information and a pair of ATM cell transmission and reception signal lines, as will be described later. In FIG. 1, these signal lines are collected and represented by one line Lij.

Figure 6:
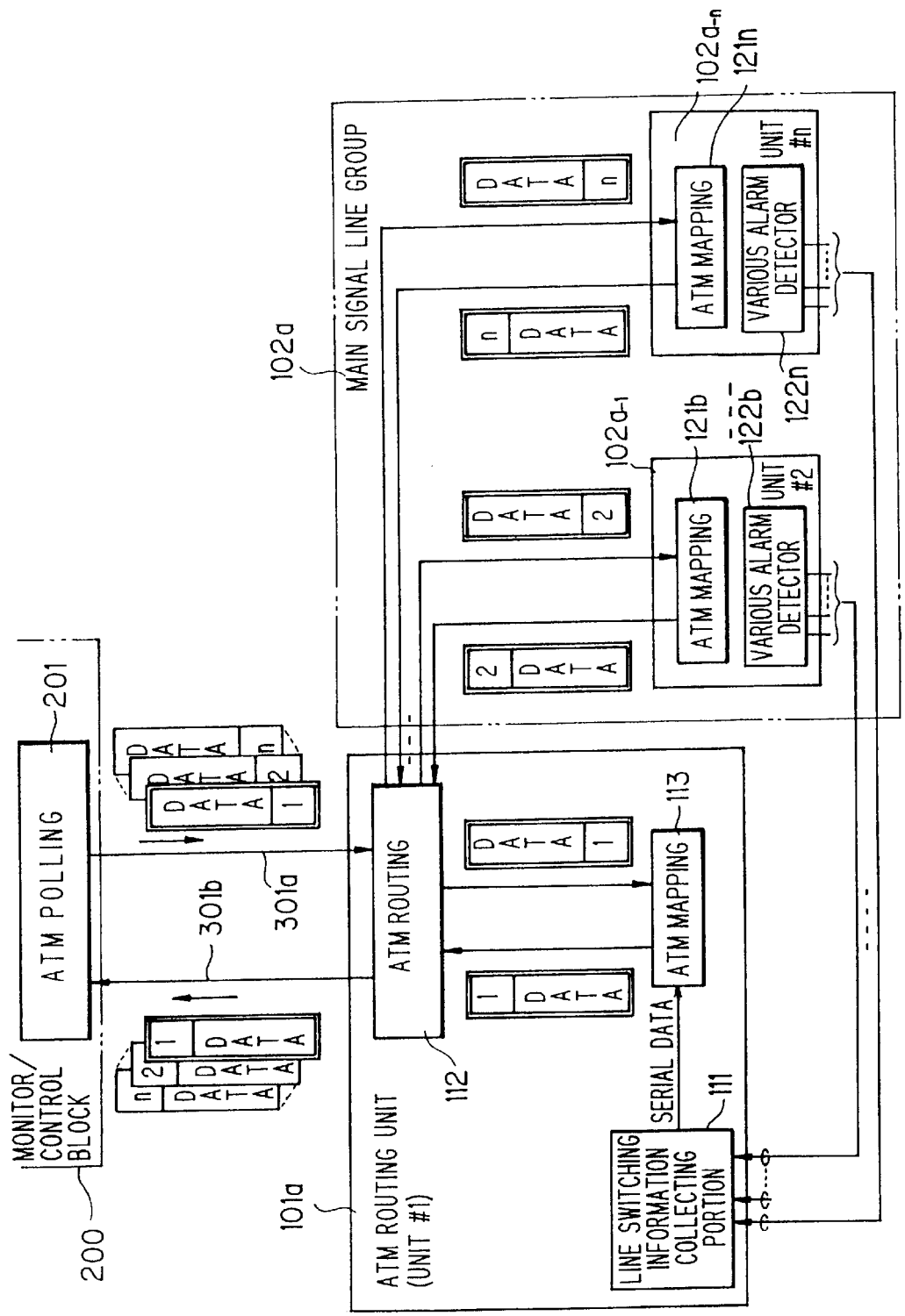
FIG. 6 shows the detailed structure of a transmission apparatus according to the present invention.

The ATM routing unit 101a to 101n as will be described later with reference to FIG. 6, is provided with a (1) line switching information collecting portion for collecting line switching information from each unit which constitutes the corresponding main signal line group 102a to 102n, (2) an ATM routing portion for transmitting an ATM cell in which the line switching information is mapped to the monitor/control block 200 via the ATM link and receiving an ATM cell which is transmitted from the monitor/control block 200, and (3) an ATM mapping portion for generating an ATM cell by mapping collected line switching information in the data field of the ATM cell and transmitting the ATM cell to the ATM cell routing portion.

Figure 2:
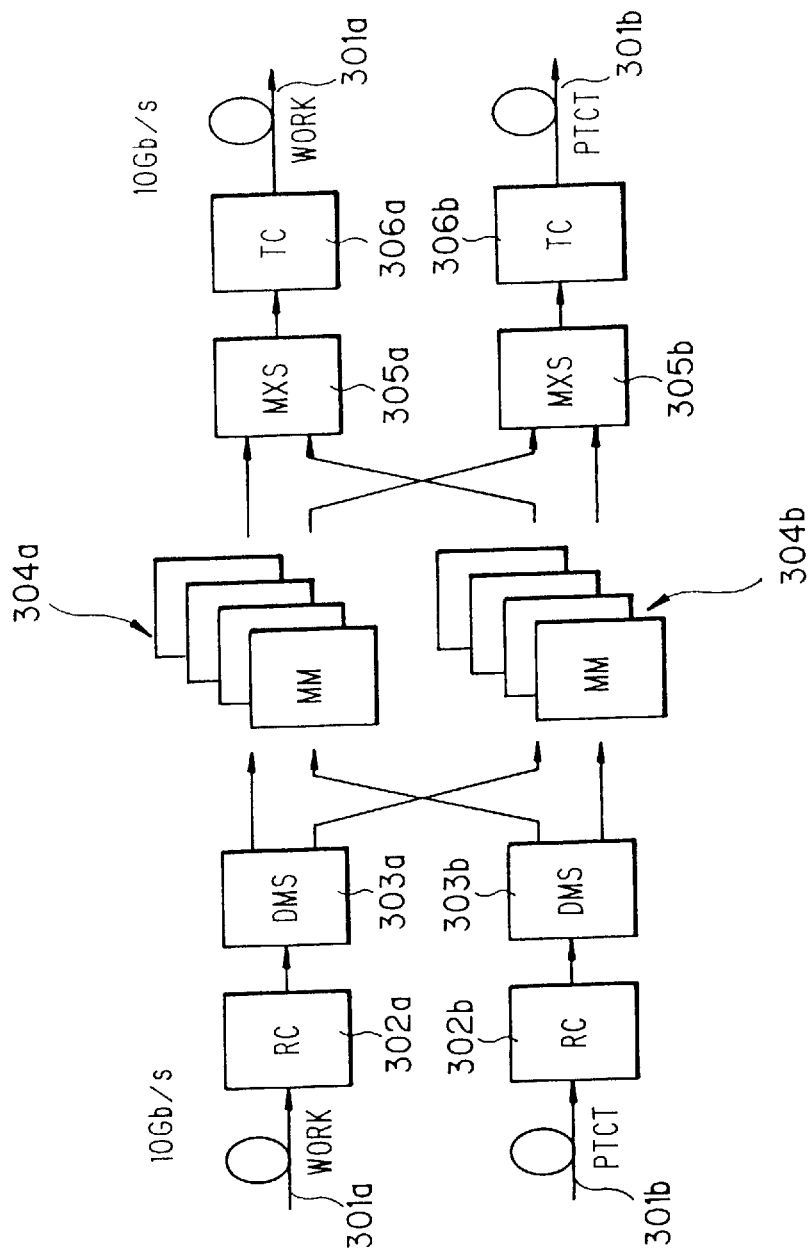
FIG. 2 shows the structure of a main signal line block.

The main signal line group 102a to 102n has, for example, the structure shown in FIG. 2. In FIG. 2, the reference numerals 301a and 301b represent working and protection optical transmission lines, respectively, of 10 GHz, 302a and 302b optical line interface units (RC) for the optical transmission lines 301a and 301b, respectively, and have O/E transducers for converting an optical signal into an electrical signal, 303a and 303b demultiplexer units (DMS) for separating high-order group signals into low-order group signals, 304a and 304b switch units (MM) for switching routes by switching the positions of the time slots of a signal, 305a and 305b multiplexer units (MXS) for multiplexing signals output from a switch unit, and 306a and 306b optical line interface units (TC) for the line transmission lines 301a and 301b, respectively, and have E/O transducers for converting an electrical signal into an optical signal. The switch units 304a and 304b switch signals separated by the demultiplexer units and output them to the multiplexer side or drop them to the tributary side, or switch a signal inserted from the tributary side over to the multiplexer side. Each unit is provided with a detector for detecting an event which necessitates line switching, and transmits the result of detection (line switching information signal) to the line switching information collecting portion of the corresponding ATM routing unit 101a to 101n.

Figures 3, 4:
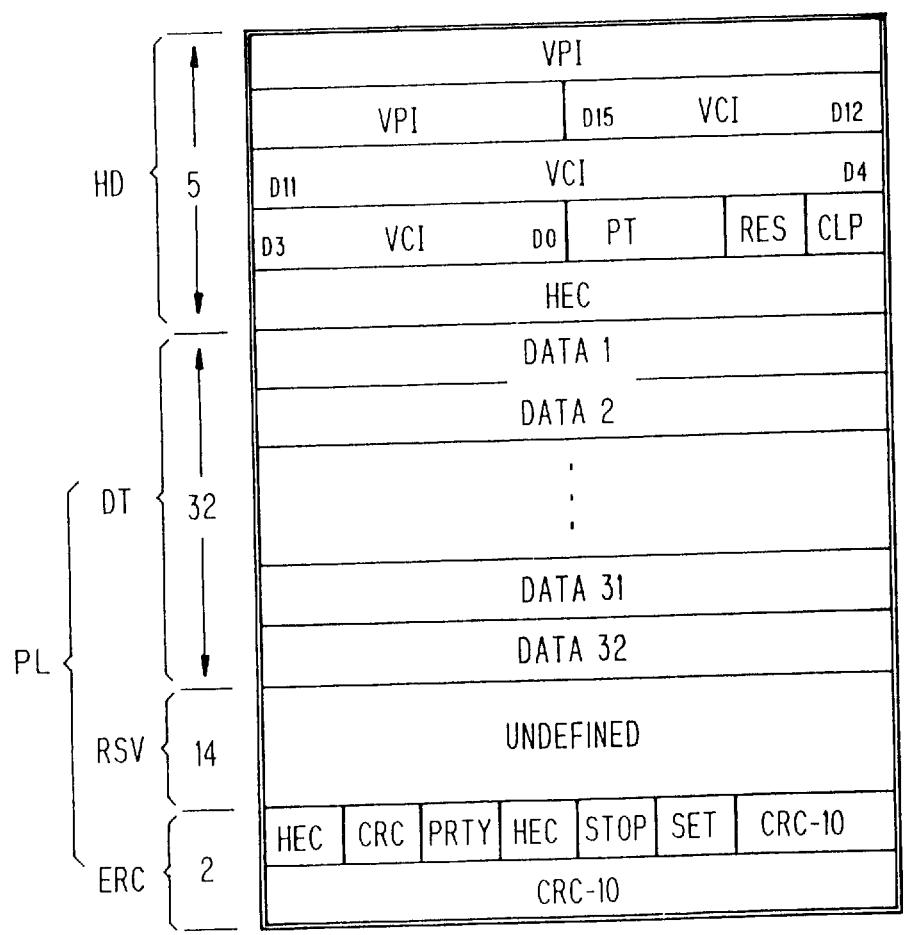
FIG. 3 shows the types of line switching information.
FIG. 4 shows the format of an ATM cell.

FIG. 3 shows the types of line switching information. Events which necessitate line switching are, for example, unit removing (RMV), blown fuse (FUSE), power source module trouble (PWR), unit oscillator trouble (EQPT), transmission line trouble (SF: signal fail), quality degradation (SD: signal degrade), etc. When each unit detects a predetermined event, it transmits the result of detection to the line switching information collecting portion of the corresponding ATM routing unit 101a to 101n.

Figure 1:
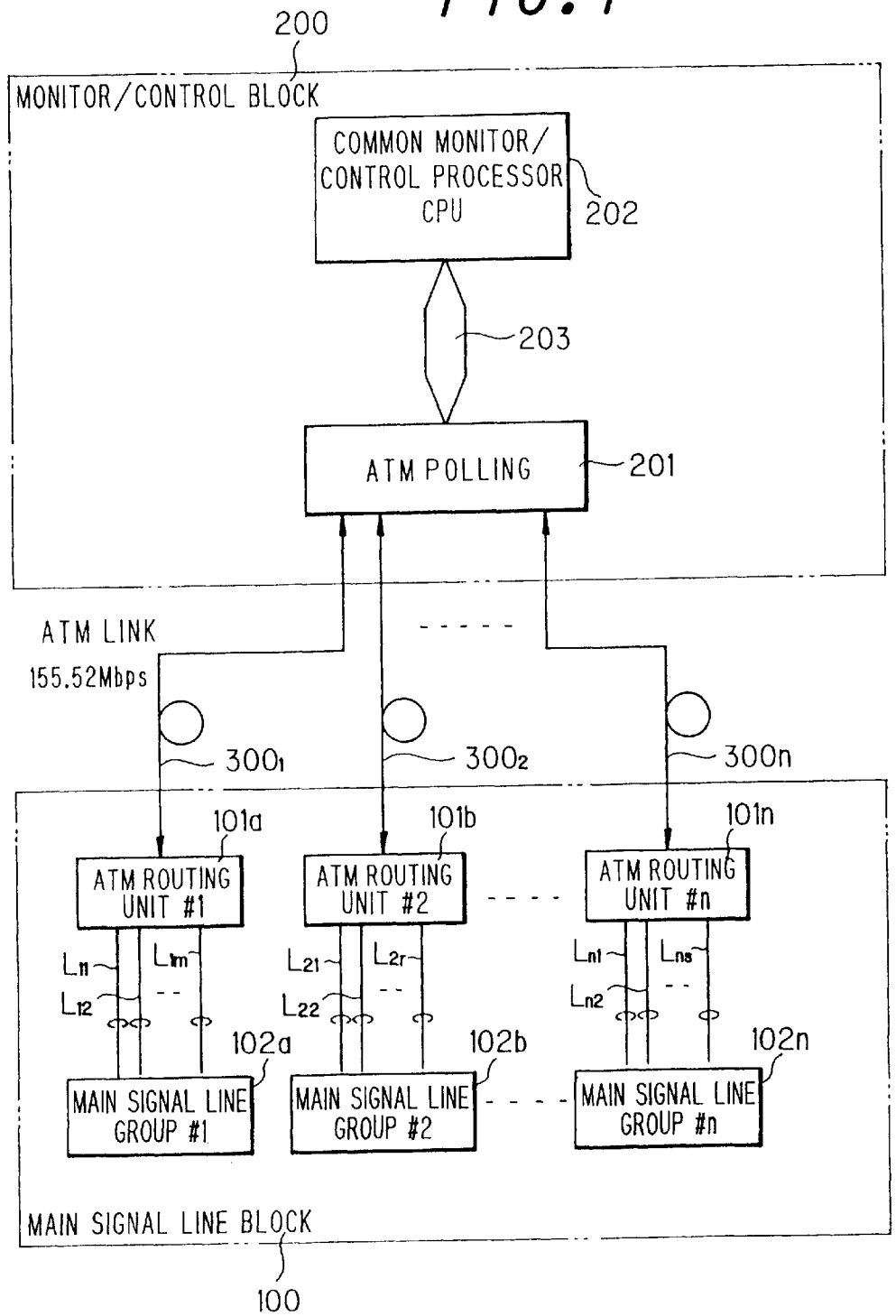
FIG. 1 shows the structure of a transmission apparatus according to the present invention.

In the monitor/control block 200 (FIG. 1), the reference numeral 201 denotes an ATM polling portion which receives ATM cells transmitted from the ATM routing portions 101a to 101n of the main signal line block 100 and transmits ATM cells (polling cells) in which predetermined information is mapped to the ATM routing portions 101a to 101n via the ATM links $300_1$ to $300_n$. The reference numeral 202 represents a monitor/control processor for collecting the line switching information via the ATM polling portion 201 so as to monitor the state of the apparatus and the lines and instruct the switching between the working/protection lines, and 203 a data bus.

The ATM polling portion 201 transmits the polling cells which request line switching information to the main signal line block 100 via the ATM links $300_1$ to $300_n$. When the ATM routing portions 101a to 101n of the main signal line block 100 receive the polling cells, they transmit the line switching information collected from each unit to the monitor/control block 200 via the ATM links $300_1$ to $300_n$ in the form of ATM cells. The ATM polling portion 201 transmits the received line switching information to the monitor/control processor 202, and the monitor/control processor 202 judges whether or not line switching is necessary, and if the answer is in the affirmative, it instructs the main signal line block 100 to switch the lines via the ATM polling portion 201.

(B) Structure of cell

FIG. 4 is an explanatory view of an ATM cell used in the present invention. The ATM cell is composed of a header portion HD of 5 bytes and a payload portion PL of 48 bytes. The payload portion is composed of a data field DT of 32 bytes, an undefined field RSV of 14 bytes and an error check field of 2 bytes.

In the header portion, the symbol VPI denotes a virtual path identifier. In the present invention, no virtual path identifier is used so that the VPI value is constantly zero. The symbol VCI denotes a virtual channel identifier, and each unit has its particular VCI value. When the ATM polling portion 201 transmits a polling cell to a predetermined unit, the VCI value of the unit is inserted into the cell. When each unit transmits an ATM cell to the monitor/control block 200, each unit inserts its own VCI value into the cell. The symbol PT represents a payload type, RES a reserve field, CLP a cell loss priority and HEC a header error control field.

The data filed DT has 32 bytes, and 1 byte is allotted to each unit so that line switching information is transmitted by using 8 bits, as shown in FIG. 5. In the unit #1, RMV (whether or not a unit is removed) is transmitted by a first bit, FUSE (whether or not a fuse is blown) by a second bid, PWR (whether or not there is a power source module trouble) by a third bit, EQPT (whether or not there is an oscillator trouble) by a fourth bit, SF (whether or not there is a signal fail) by a seventh bit and SD (whether or not there is a quality degeneration) by an eighth bit.

(C) Detailed structure of transmission apparatus (a) Entire structure

FIG. 6 is a detailed structure of a transmission apparatus in the part which is related to the collection of line switching information, i.e., one ATM routing unit and one main signal line group are shown. The reference numeral 101a represents an ATM routing unit (unit #1), 102a a main signal line group, 200 the monitor/control block, 201 the ATM polling portion, and 301a and 301b ATM links of 155 Mbps.

In the ATM routing unit 101a, the reference numeral 111 denotes a line switching information collecting portion for collecting line switching information supplied from each unit which constitutes the corresponding main signal line group 102a. The reference numeral 112 denotes an ATM routing portion for transmitting an ATM cell in which line switching information is mapped to the monitor/control block 200 via an ATM link of 155 Mbps, and routing the ATM cell received from the monitor/control block 200 to a predetermined unit, and 113 an ATM mapping portion for generating an ATM cell by mapping the collected line switching information in a data field of a raw ATM cell and transmitting the ATM cell to the ATM routing portion 112, and also receiving an ATM cell transmitted from the ATM routing portion 112.

In the main signal line group 102a, the reference numerals 102a-1 to 102a-n represent units (see FIG. 2) for transmitting a main signal, which are provided with ATM mapping portions 121b to 121n for transmitting and receiving an ATM cell between the ATM routing portion 112 and the units, and alarm detectors 122b to 122n for detecting an event (see FIG. 3) which necessitates line switching in the respective units. Each of the units 102a-1 to 102a-n receives a polling cell from the monitor/control block 200 via the ATM routing portion 112, and (1) when the polling cell contains various set data, the unit sets the data at a predetermined position in the unit, and (2) when the polling cell requests various information (such as an error state in the unit and unit identification information), the unit generates a response cell by the ATM mapping portion and transmits the cell to the monitor/control block 200 via the ATM routing portion 112. When the polling cell instructs line switching, the line switching unit which is one of the units 102a-1 to 102a-n controls the line switching operation in accordance with the instruction. When the polling cell requests line switching information, the ATM routing unit 101a transmits the line switching information to the monitor/control block 200 in the form of an ATM cell.

The alarm detectors 122b to 122n of the respective units are connected to the line switching information collecting portion 111 by one signal line for one event which necessitates line switching so as to transmit whether or not there is such an event (result of detection).

(b) Line switching information collecting portion

Figure 7:
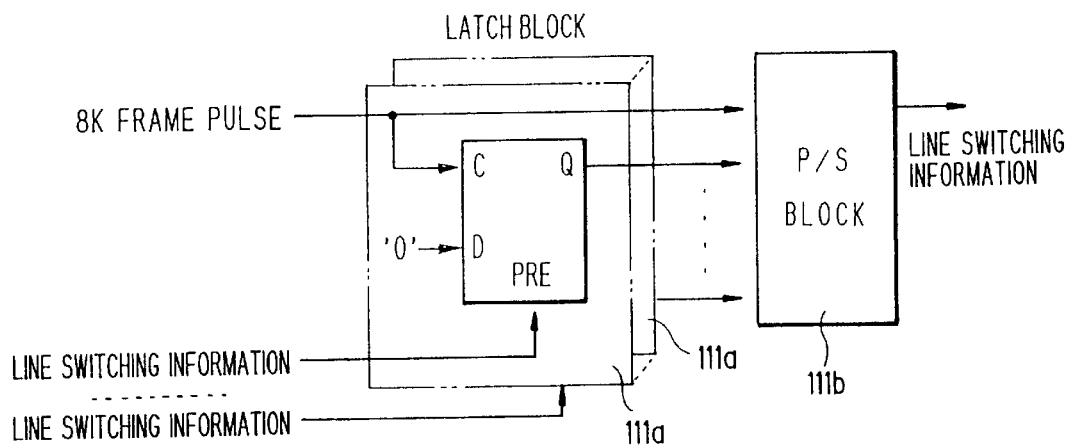
FIG. 7 shows the structure of a line switching information collecting portion.

FIG. 7 shows the structure of the line switching information collecting portion 111. The reference numeral 111a represents a latch block for latching line switching information supplied from each unit for every event, wherein the symbol C denotes a clock terminal, D a data terminal, PRE a preset terminal and Q an output terminal. When a high-level line switching information is input to the preset terminal, the latch block 111a is immediately set so that the Q output becomes a high level signal, while when a low-level line switching information is input to the preset terminal, the latch block 111a is reset to "0" by a clock signal of 8 KHz. The latch block 111a is not reset while the preset signal is at a high level. The reference numeral 111b represents a serializing block (a parallel/serial converter) for serializing line switching information so that they can be easily mapped in an ATM cell and transferring the line switching information serially to the ATM mapping portion 113 (FIG. 6). The serializing block 111b transfers the latched line switching information serially to the ATM mapping portion 113 at every 8 KHz.

According to the line switching information collecting portion 111, even if the number of pieces of line switching information increases with an increase in the line capacity, high-speed processing is enabled by processing the information as serial data, thereby lightening the burden of the processor.

(c) Transmission and reception of ATM cell in start-stop synchronization

Figure 8:
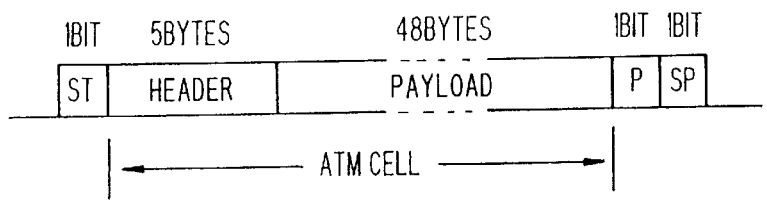
FIG. 8 shows the format of an ATM cell between an ATM pouting block and an ATM mapping block.

The transmission and reception of an ATM cell between the ATM routing portion 112 and each ATM mapping portion 113, 121b to 121n is executed in start-stop synchronization. As shown in FIG. 8, a start bit ST is attached to the head of an ATM cell, a stop bit SP is attached to the end of the ATM cell, and an odd parity bit P is attached before the stop bit SP. The ATM cell is transmitted and received between each ATM mapping portion 113, 121b to 121 and the ATM routing portion 112 in start-stop synchronization.

Figure 9:
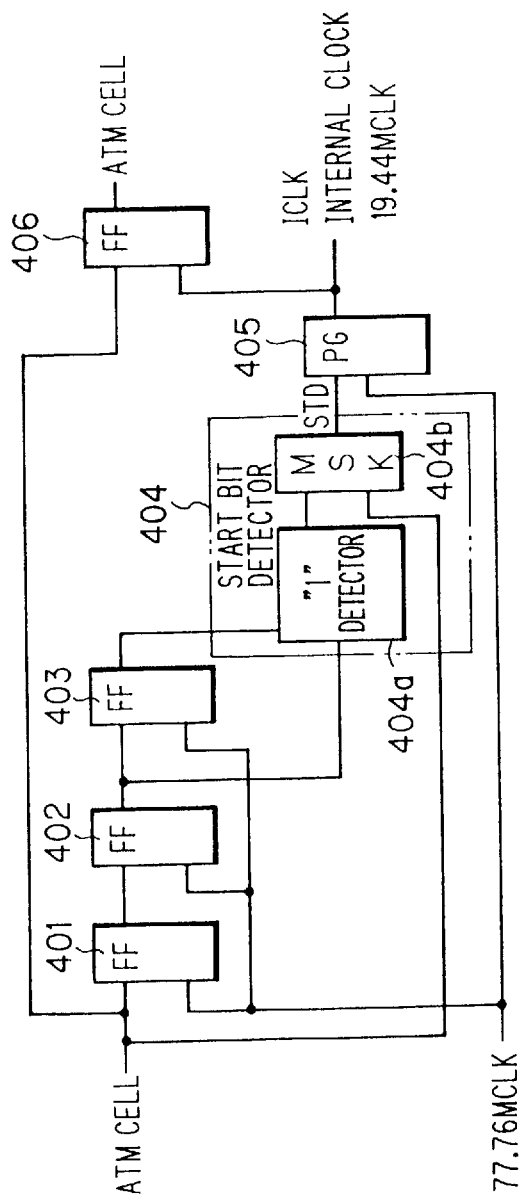
FIG. 9 shows the structure of an ATM cell receiver.
Figure 10:
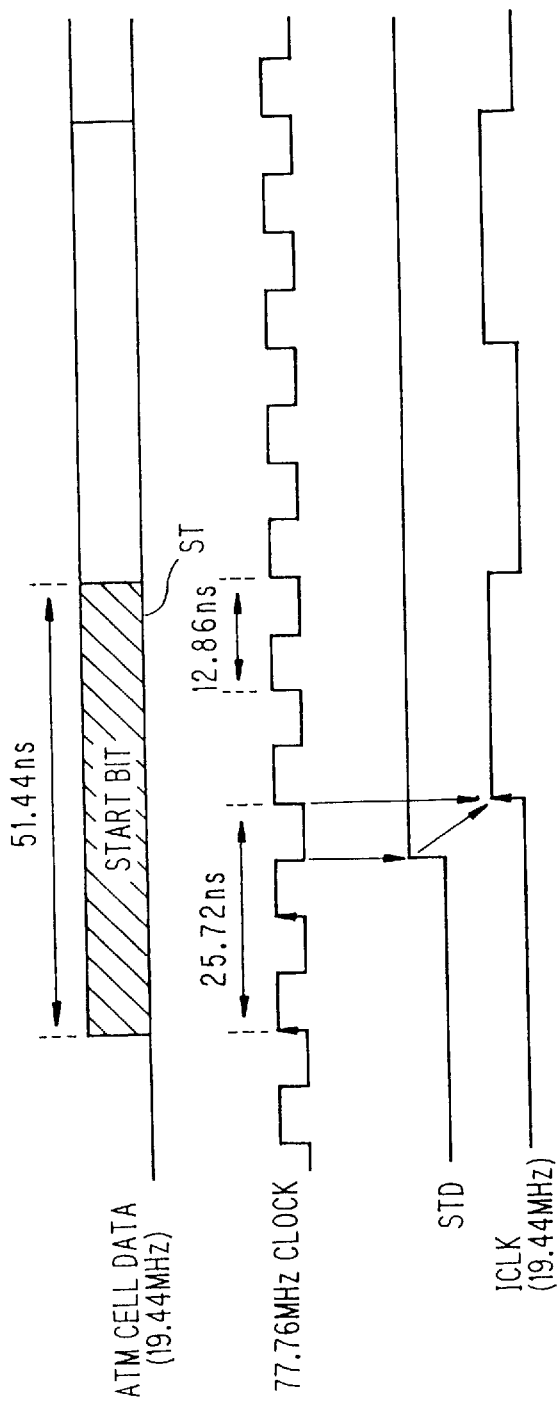
FIG. 10 shows the waveform explaining the operation of the ATM cell receiver.

FIG. 9 shows the structure of an ATM cell receiver provided in the ATM routing portion 112 and each ATM mapping portion 113, and FIG. 10 shows the waveform explaining the operation of the ATM cell receiver.

In FIG. 9, the reference numerals 401 to 403 represent flip flops which are operated at an clock of 77.76 MHz and which have a three-stage shift register. An ATM cell is input to a first stage. The reference numeral 404 denotes a start bit detector which includes a "1" detector 404a for outputting a high level signal when a flip flop 402 at a second stage is set and a flip flop 403 at a third stage is reset, and a mask circuit (MSK) 404b which outputs a start bit detection signal STD for 1 ATM cell period when the output of the "1" detector 404a is a high level signal and the ATM cell (start bit ST) is at a high level. The reference numeral 405 represents a pulse generator (PG) for generating an internal clock ICLK of 19.44 MHz of which period is equal to that of 1-bit data of ATM cell, when the start bit detection signal STD is at a high level. It is to be noted that the internal clock ICLK rises at the center of each bit of an ATM cell. The reference numeral 406 represents a flip flop for serially taking 1-bit data "0", "1" of an ATM cell in synchronism with the rise of the internal clock ICLK.

Figure 11:
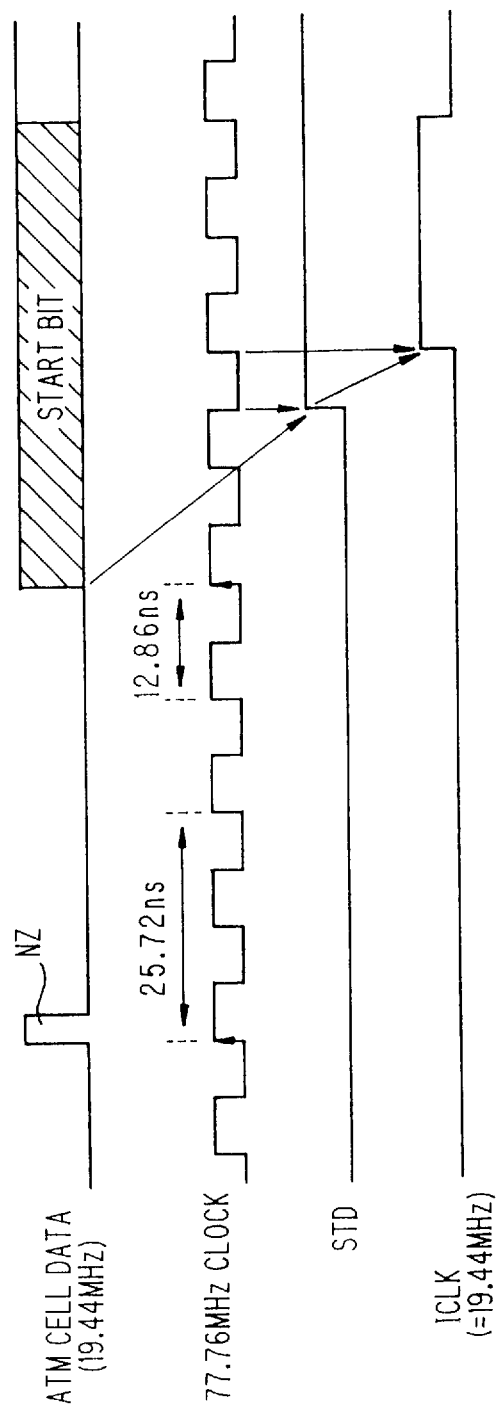
FIG. 11 shows the waveform explaining the operation of preventing noise from being detected as a start bit in error.

According to the above-described structure, since an ATM cell is taken when the start bit ST is detected and the internal clock ICLK rises at the center of each bit of the ATM cell, it is possible to take the ATM cell data correctly. FIG. 11 shows the waveform explaining the operation of preventing noise from being detected as a start bit in error. Even if the output of the "1" detector 404*a* becomes a high-level signal due to noise NZ, since the ATM cell (start bit) is at a low level, a high-level start signal is not output from the mask circuit 404*b*, so that the internal clock ICLK is not generated.

(d) Monitor/control block

Figure 12:
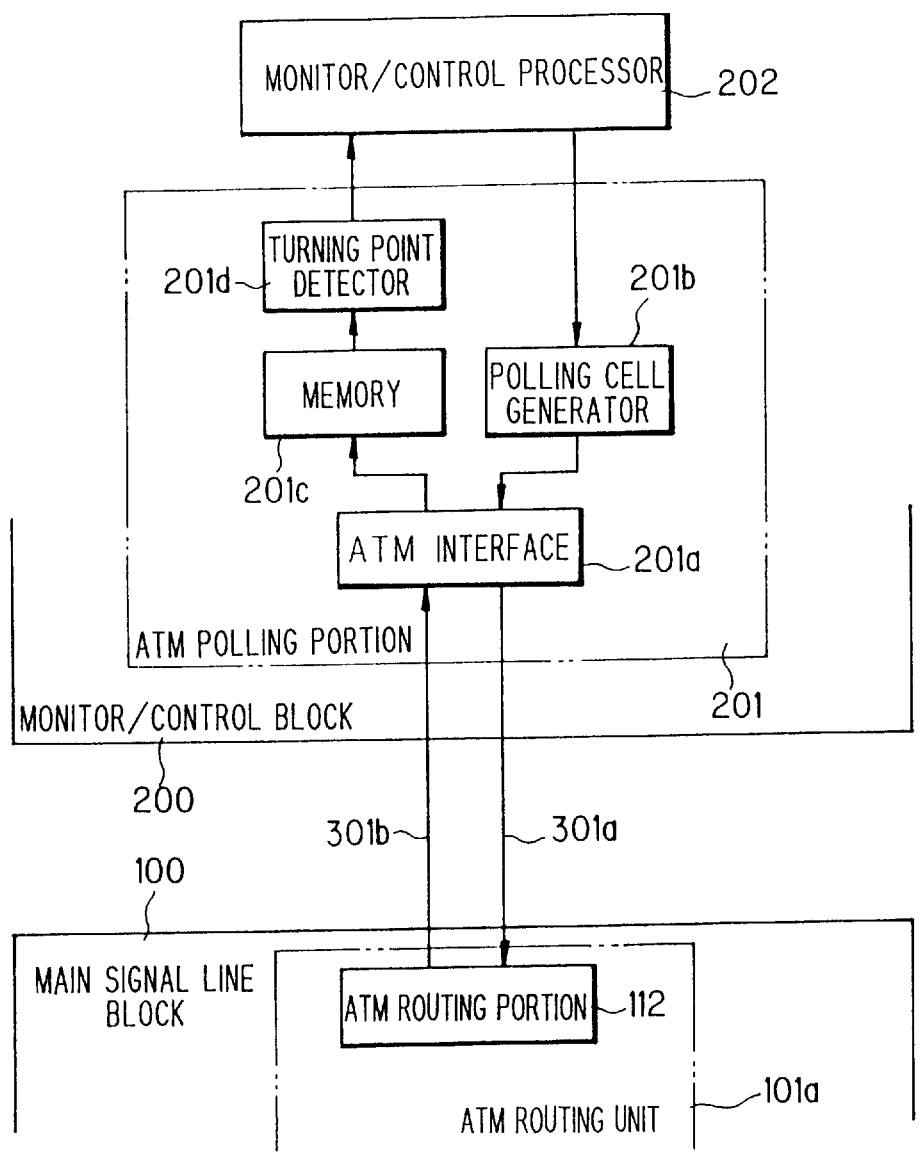
FIG. 12 shows the structure of a monitor/control block.

FIG. 12 shows the structure of the monitor/control block 200. The monitor/control block 200 is provided with the ATM polling portion 201 and the monitor/control processor 202. In the ATM polling portion 201, the reference numeral 201*a* represents an ATM interface, 201*b* a polling cell generator for generating a polling cell, 201*c* a memory for developing the received line switching information and 201*d* a turning point detector for detecting the turning point of data and reporting it to the monitor/control processor 202.

(e) Entire operation

The polling cell generator 201*b* (FIG. 12) of the ATM polling portion 201 periodically, for example, at every 500 msec, transmits a polling cell to the ATM routing unit 101*a* of the main signal line block 100 via the ATM link 301*a*. The ATM routing portion 112 of the ATM routing unit 111*a* confirms that the received cell is addressed thereto by reference to the VCI value and transmits the received cell to the ATM mapping portion 113 (FIG. 6). When the ATM mapping portion 113 confirms that line switching information is requested, it maps the line switching information collected by the line switching information collecting portion 111 in an ATM cell (response cell) and transmits the ATM cell to the ATM routing portion 112. The ATM routing portion 112 transmits the ATM cell to the ATM polling portion 201 via the ATM link 301*b* of 155 Mbps.

The ATM polling portion 201 develops the line switching information contained in the response cell in the memory 201*c* (FIG. 12), then detects the turning point of the data, and reports the memory address of the detected turning point to the monitor/control processor 202. The monitor/control processor 202 updates the contents of a memory on the basis of the memory address of the turning point and judges whether or not line switching is necessary. If line switching is necessary, the monitor/control processor 202 instructs the ATM polling portion 201 to switch the lines of the main signal line group. In accordance with the line switching instruction, the polling cell generator 201*b* of the ATM polling portion 201 maps the line switching instruction data in an ATM cell and transmits the ATM cell to the ATM routing unit 110*a*. In this case, the unit to which the ATM cell is transmitted is a unit (line switching unit) having a line switching function in the main signal line group, and the VCI value of the unit is inserted into the ATM cell.

The ATM routing portion 112 of the ATM routing unit 101*a* transmits the ATM cell to the line switching unit by reference to the VCI value. The line switching unit switches the lines in accordance with the line switching instruction contained in the ATM cell. If the line switching unit exists in another main signal line group, the ATM cell for line switching is transmitted to the ATM routing portion which corresponds to that group.

In the above-described process, the operation of instructing line switching is executed. The operation of transmitting and receiving between the monitor/control block 200 and each unit will now be described. In this case, the ATM cell (polling cell) supplied from the ATM polling portion 201 is transmitted to a designated unit after the VCI value of the ATM cell is identified by the ATM routing portion 112 in the main signal line block 100. Each of the ATM mapping portions 121*b* to 121*n* provided in the corresponding unit 102*a* to 102*b* in the main signal line block 100 generates a response cell which has a predetermined response value as a status to the polling cell, and transmits it to the ATM polling portion 201 via the ATM routing portion 112. The ATM polling portion 201 recognizes each unit by reference to the VCI value of the response cell supplied from the main signal line block 100 and develops the response data in the memory 201*c*.

As described above, since the communication of line switching information between the monitor/control block and the main signal line block is executed by a polling method using an ATM cell via an ATM link connecting the monitor/control block and the main signal line block, prevention of a degradation of a signal and high-speed communication of line switching information are realized.

(D) Structure of shelf

Figure 13A:
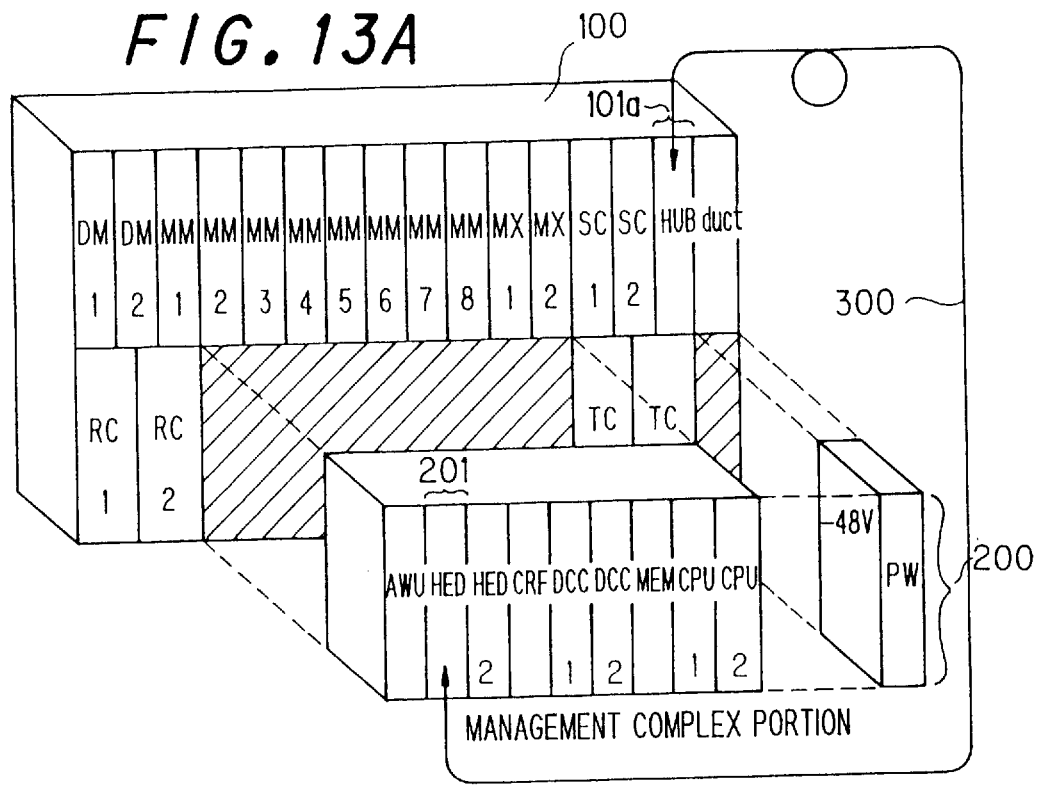
FIGS. 13A and 13B show the structure of a shelf of a transmission apparatus according to the present invention.
Figure 13B:
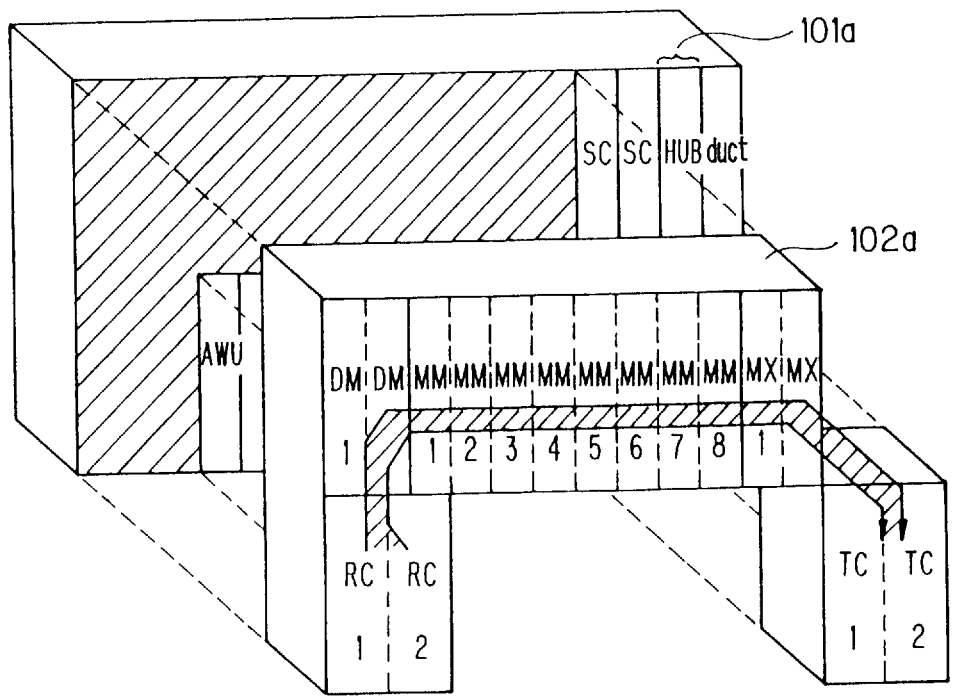
Figure 14:
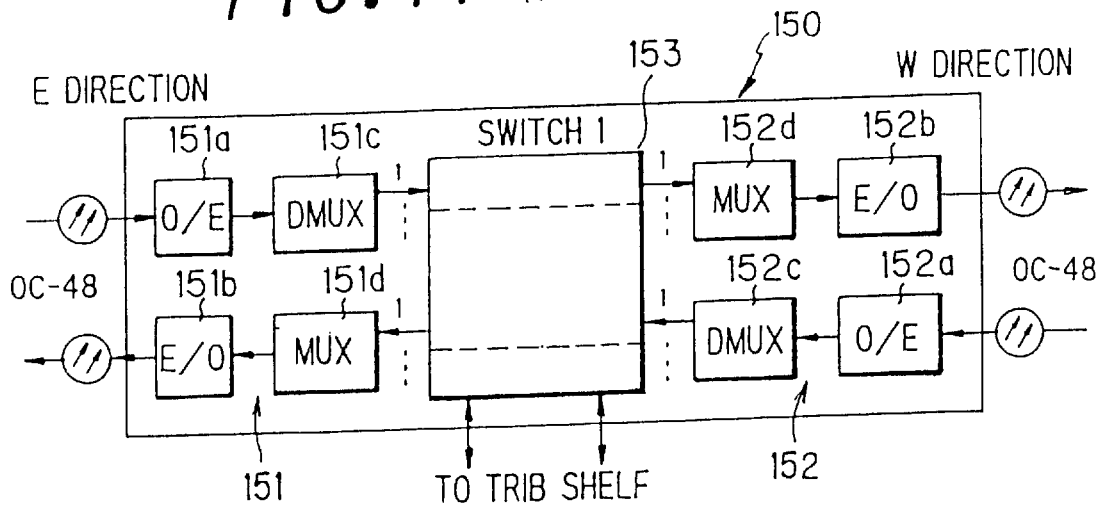
FIG. 14 shows the structure of an HS shelf.
Figure 15:
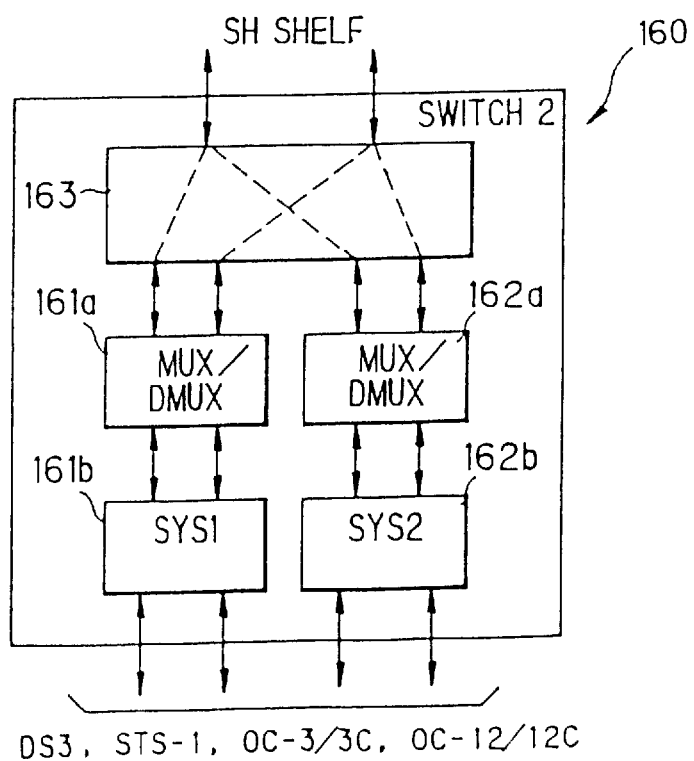
FIG. 15 shows the structure of a TRIB shelf.
Figure 16A:
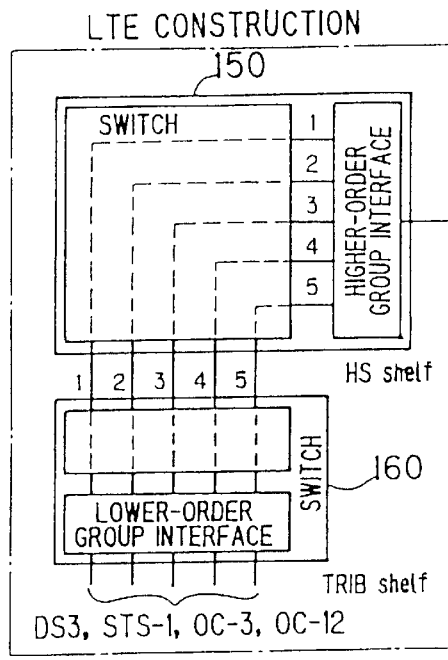
FIGS. 16A, 16B and 16C show the structures of LTE, LNR and ADM, respectively.
Figure 16B:
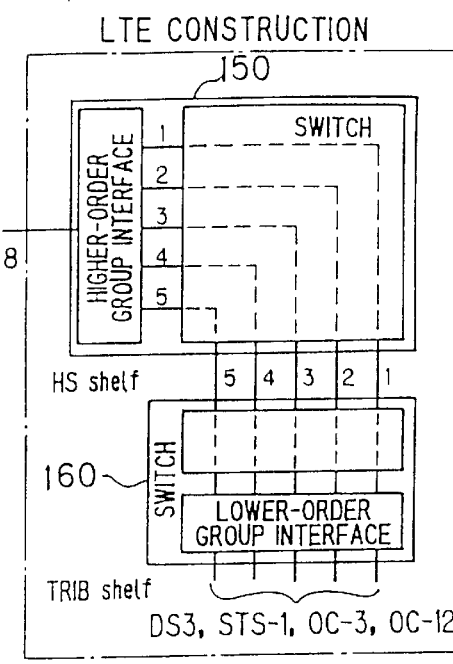
Figure 16C:
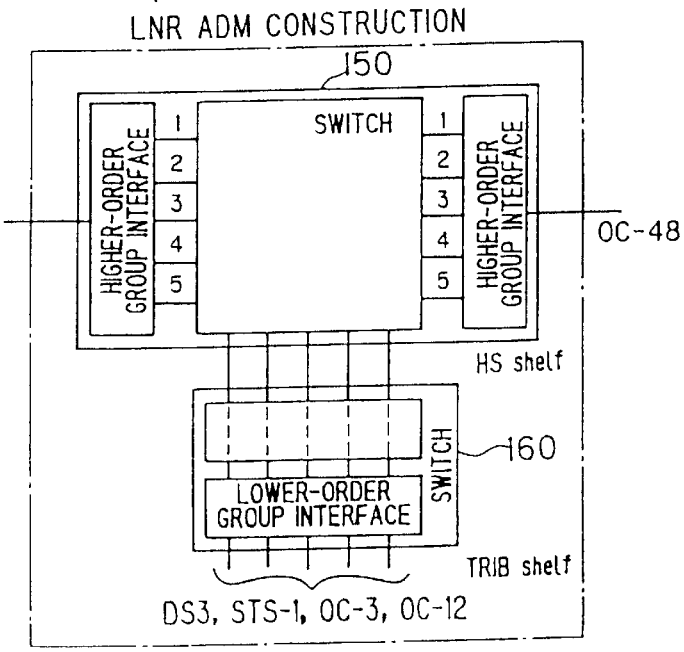
Figure 17:
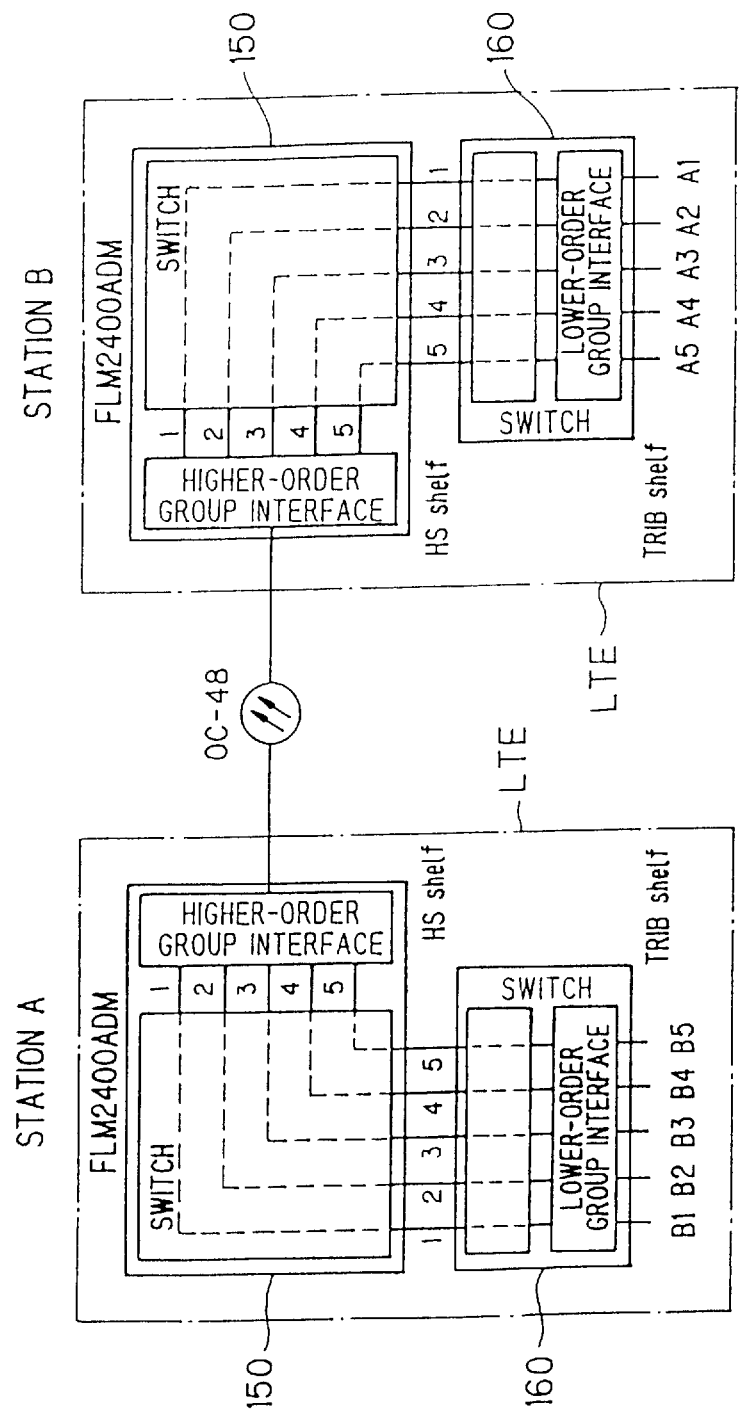
FIG. 17 shows a point-to-point system.
Figure 18:
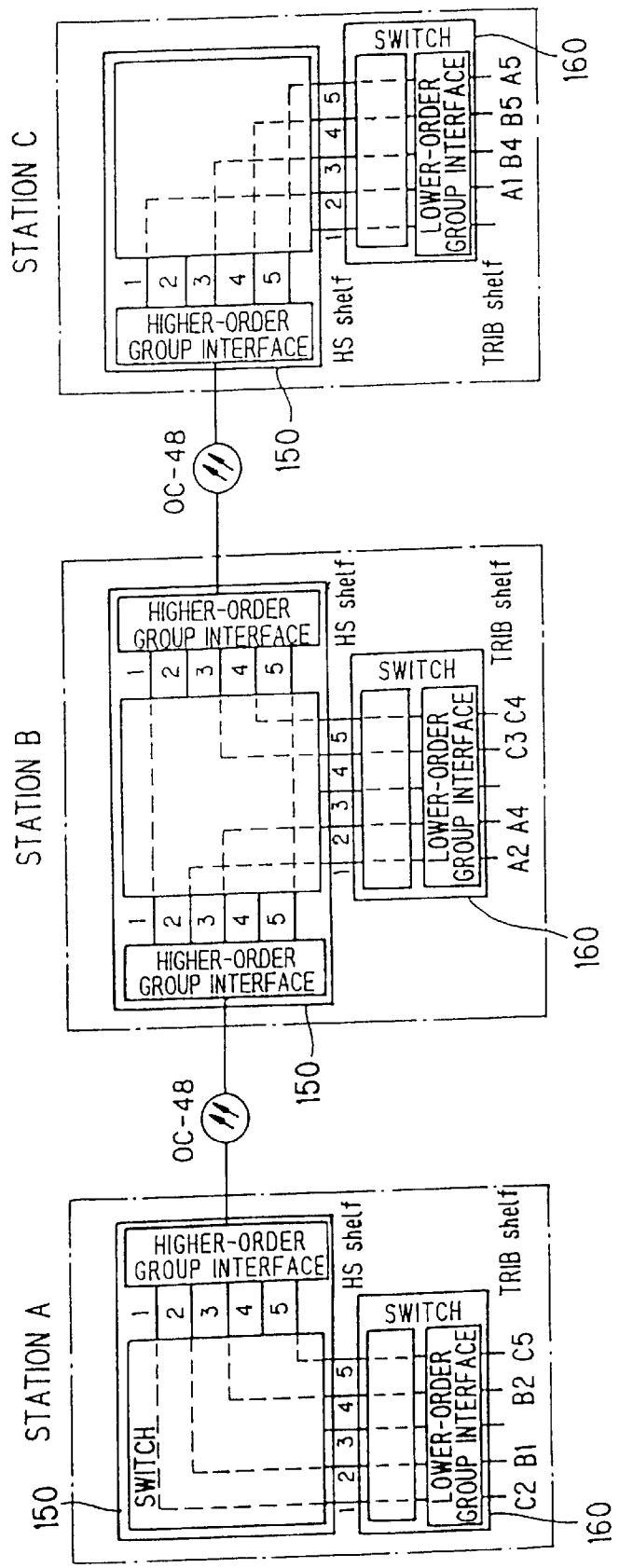
FIG. 18 shows a linear ADM system.
Figure 19:
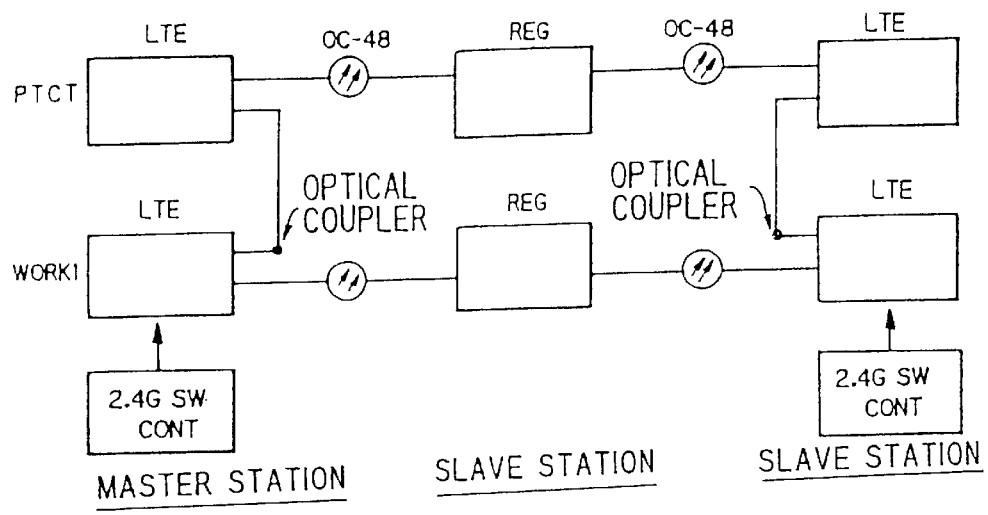
FIG. 19 shows a 1+1 line switching point-to-point system.
Figure 20:
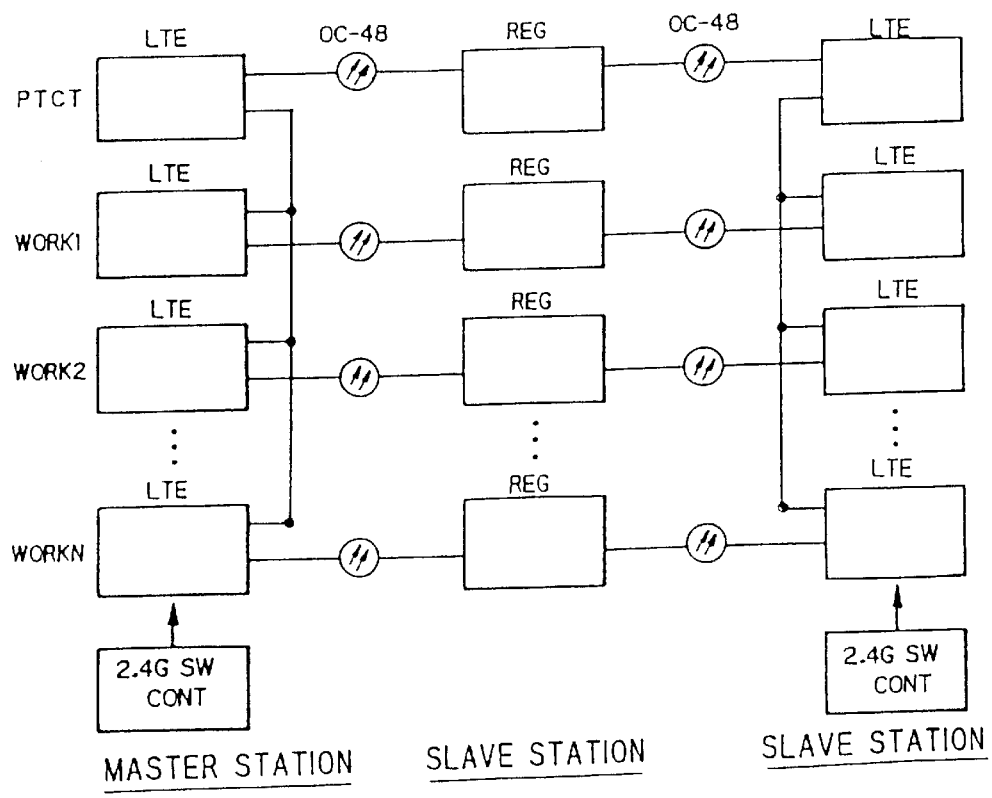
FIG. 20 shows a 1:N line switching point-to-point system.
Figure 21A:
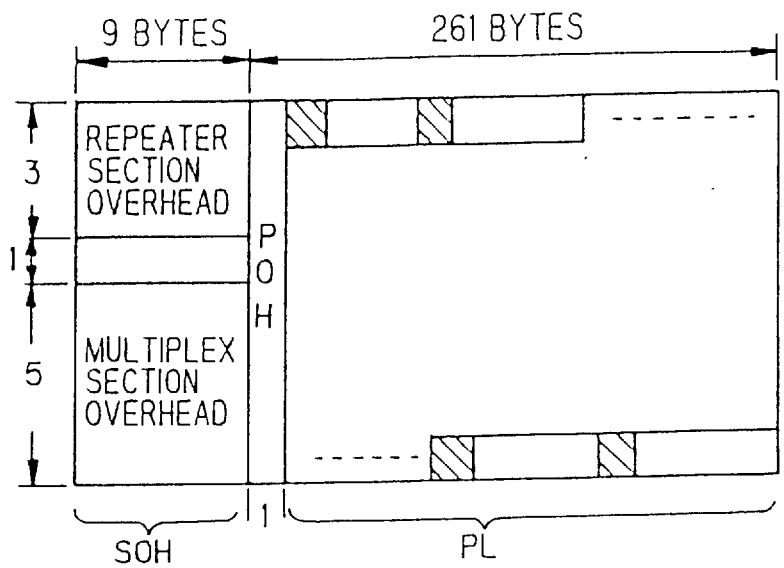
FIGS. 21A and 21B are explanatory views of a SONET OC-3 frame format.
Figure 21B:
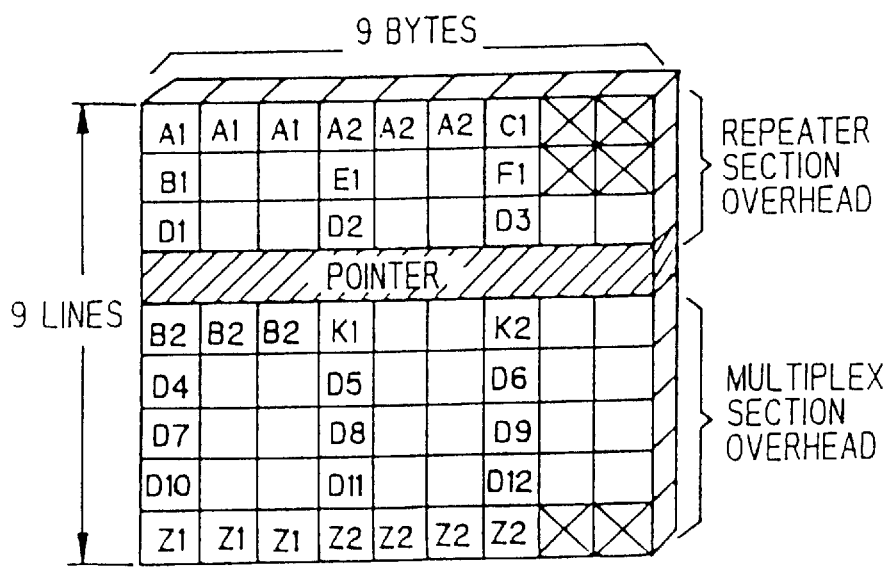
Figure 22:
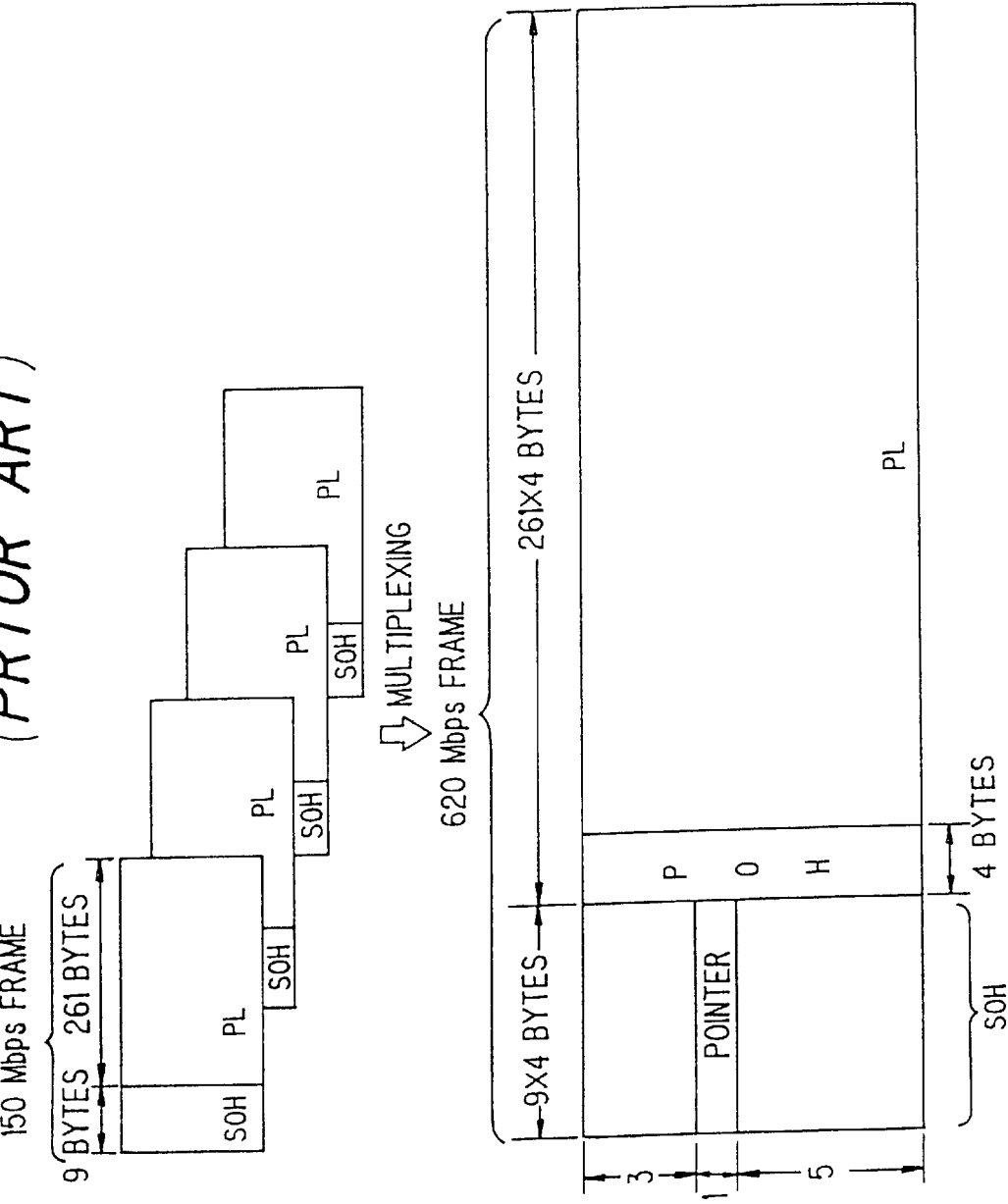
FIG. 22 is an explanatory view of a SONET OC-12 frame format.
Figure 23:
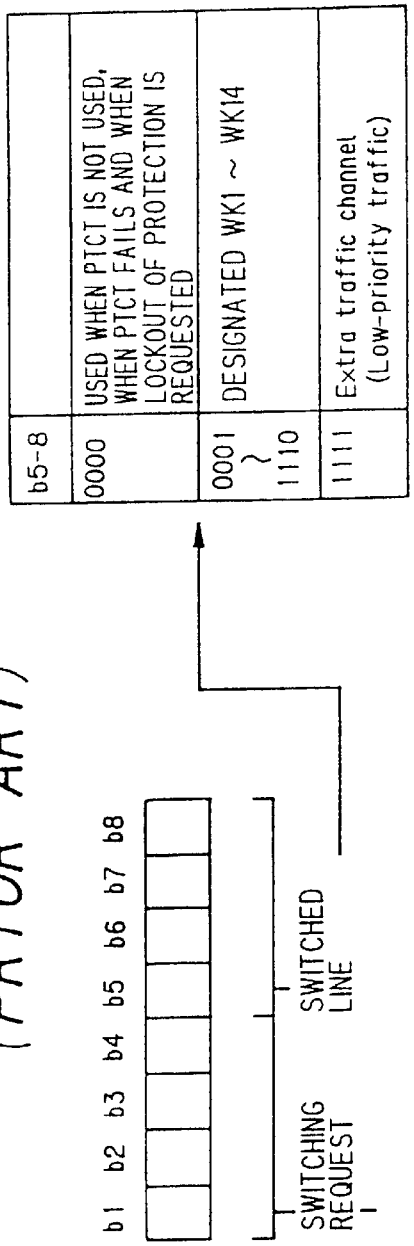
FIG. 23 is an explanatory view of a K1 byte.
Figure 25A:
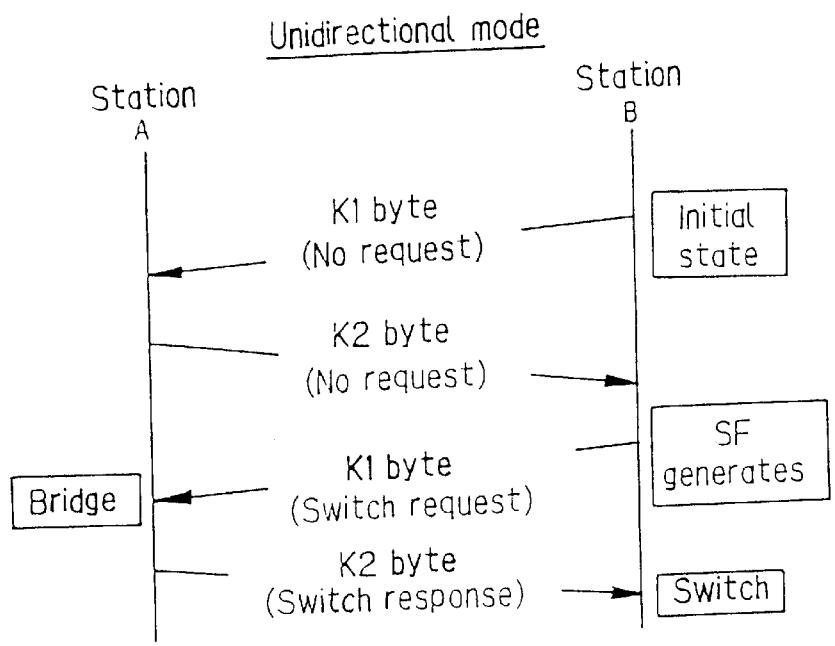
FIGS. 25A and 25B show the transmission and reception sequences for the K1 byte and the K2 byte.
Figure 25B:
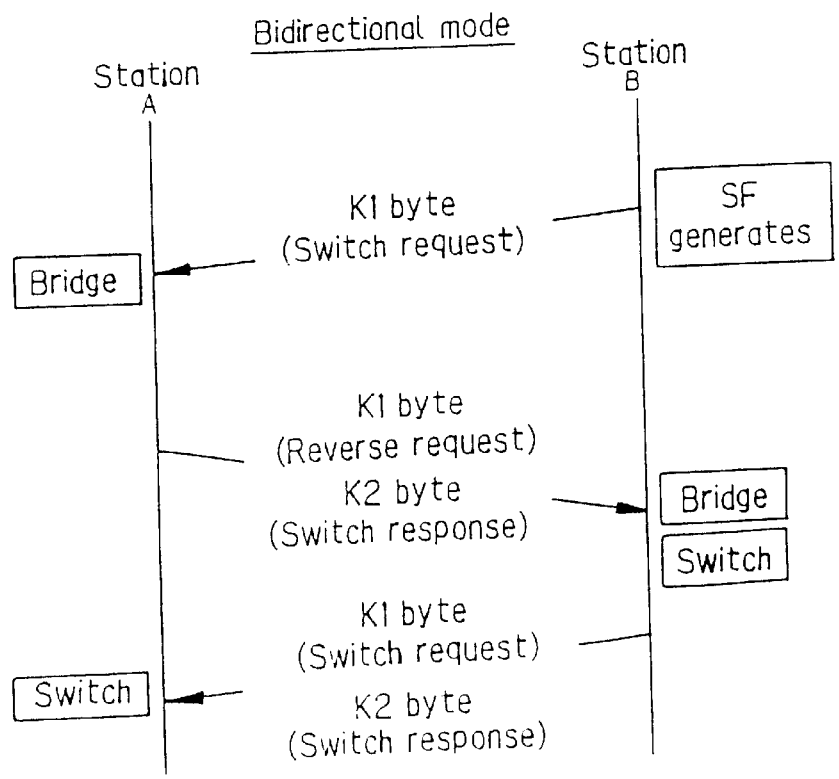
Figure 26:
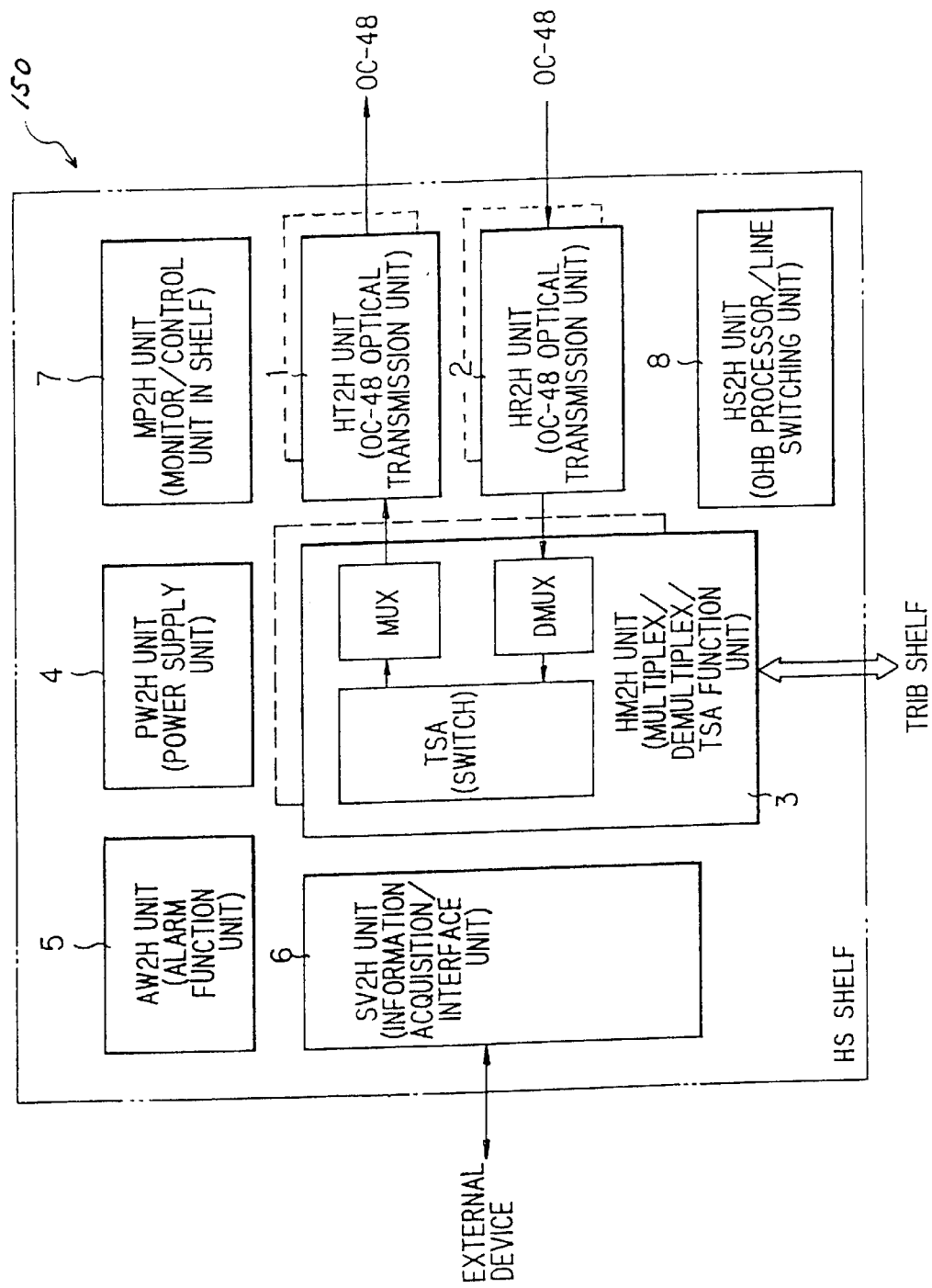
FIG. 26 shows the structure of an HS shelf.
Figure 27:
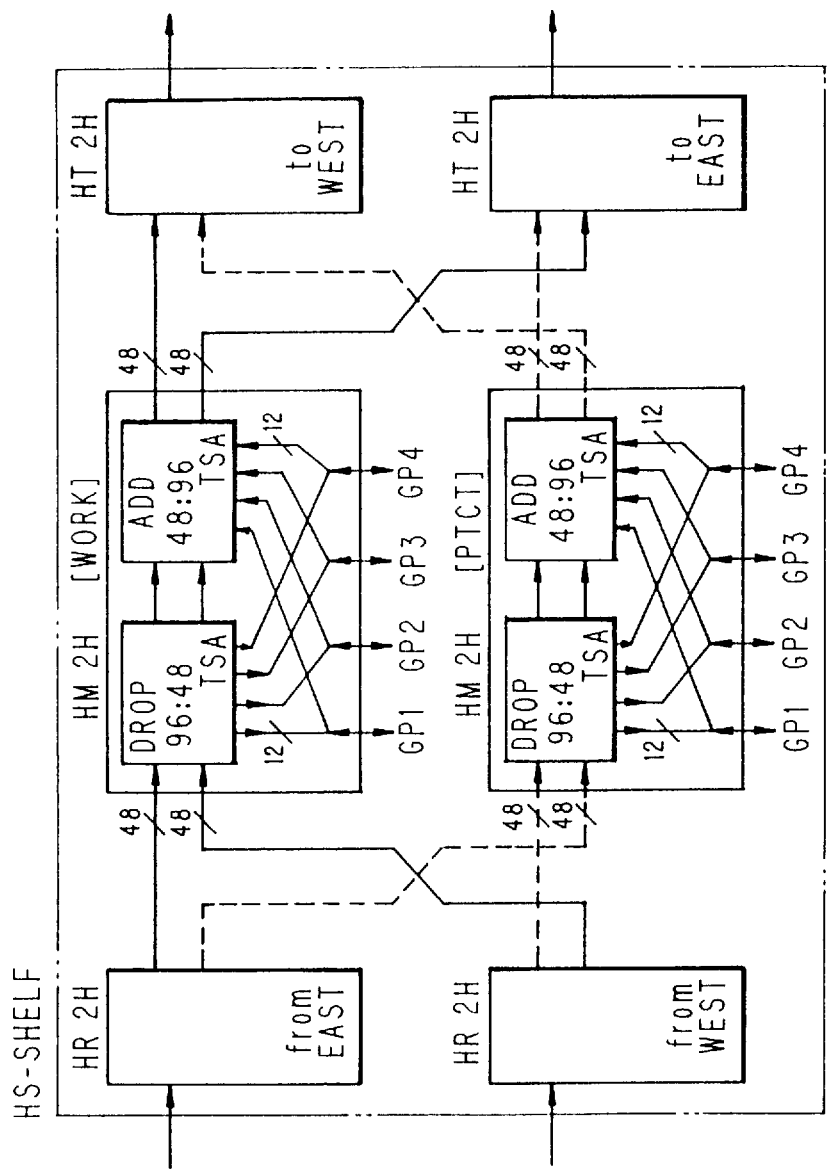
FIG. 27 shows the connecting structure of the main signal system in the HS shell.
Figure 28:
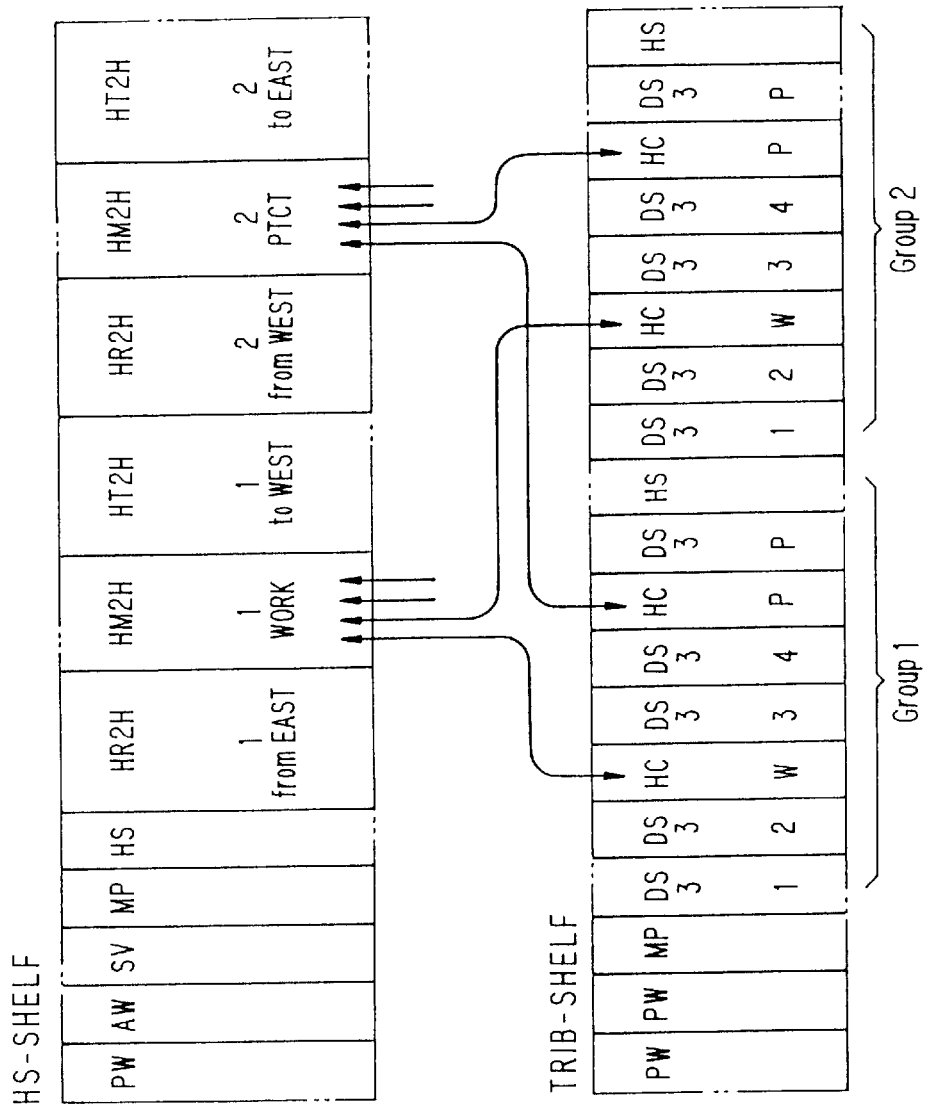
FIG. 28 is an explanatory view of the positions of the slots of the HS shelf and the TRIB shelf.
Figure 29:
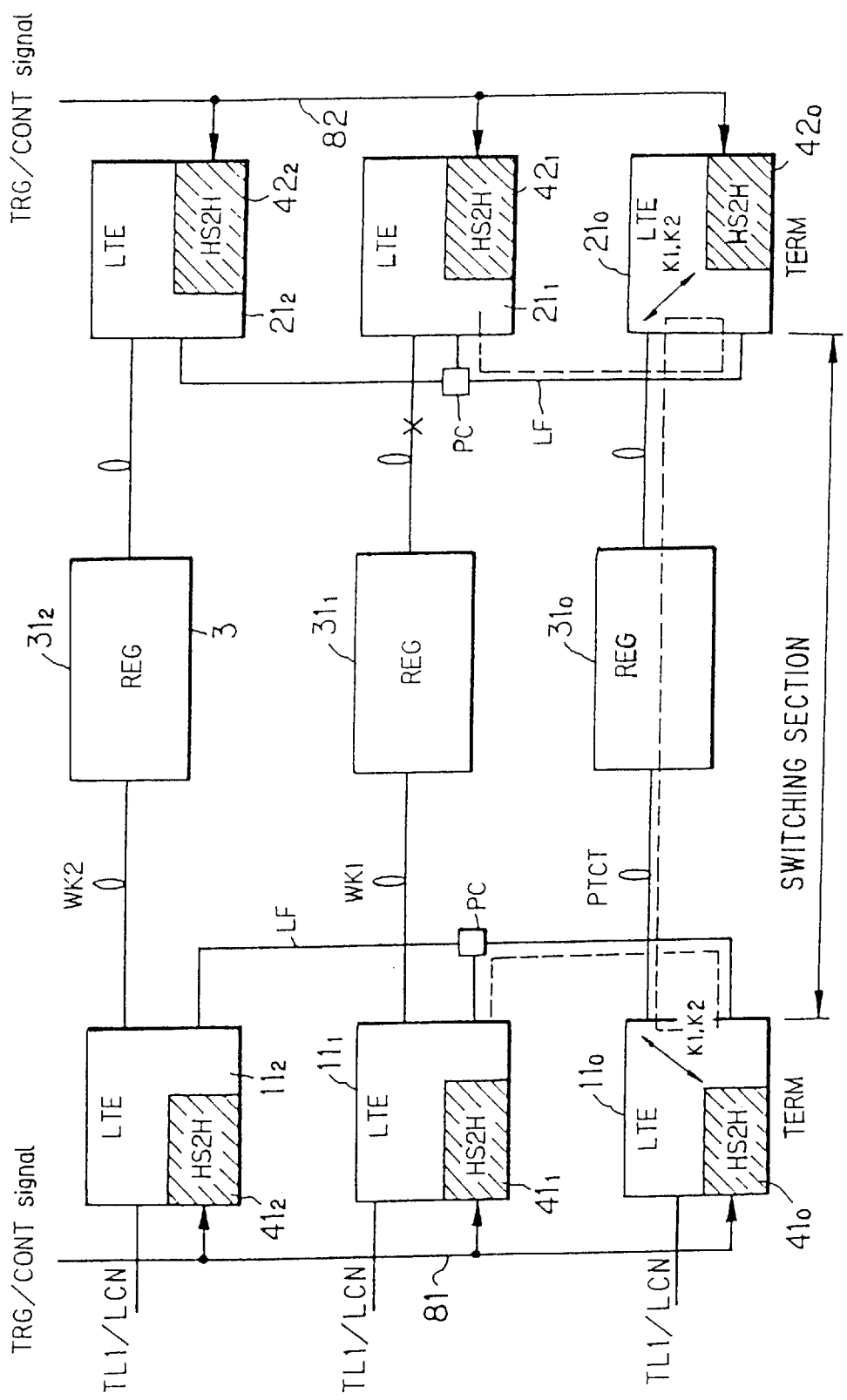
FIG. 29 shows a first line switching control process in a 1:N line switching point-to-point system.
Figure 30:
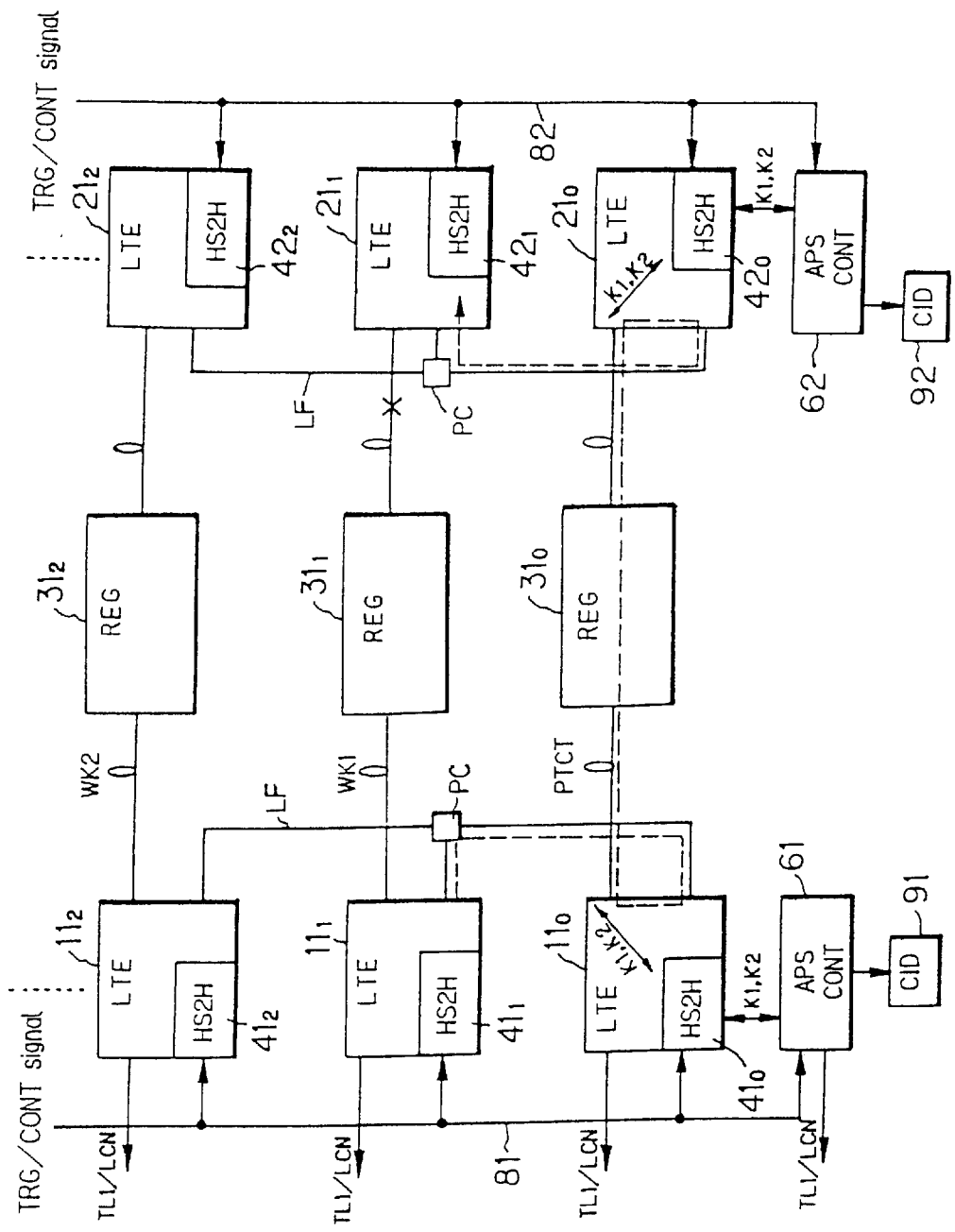
FIG. 30 shows a second line switching control process in a 1:N line switching point-to-point system.
Figure 31:
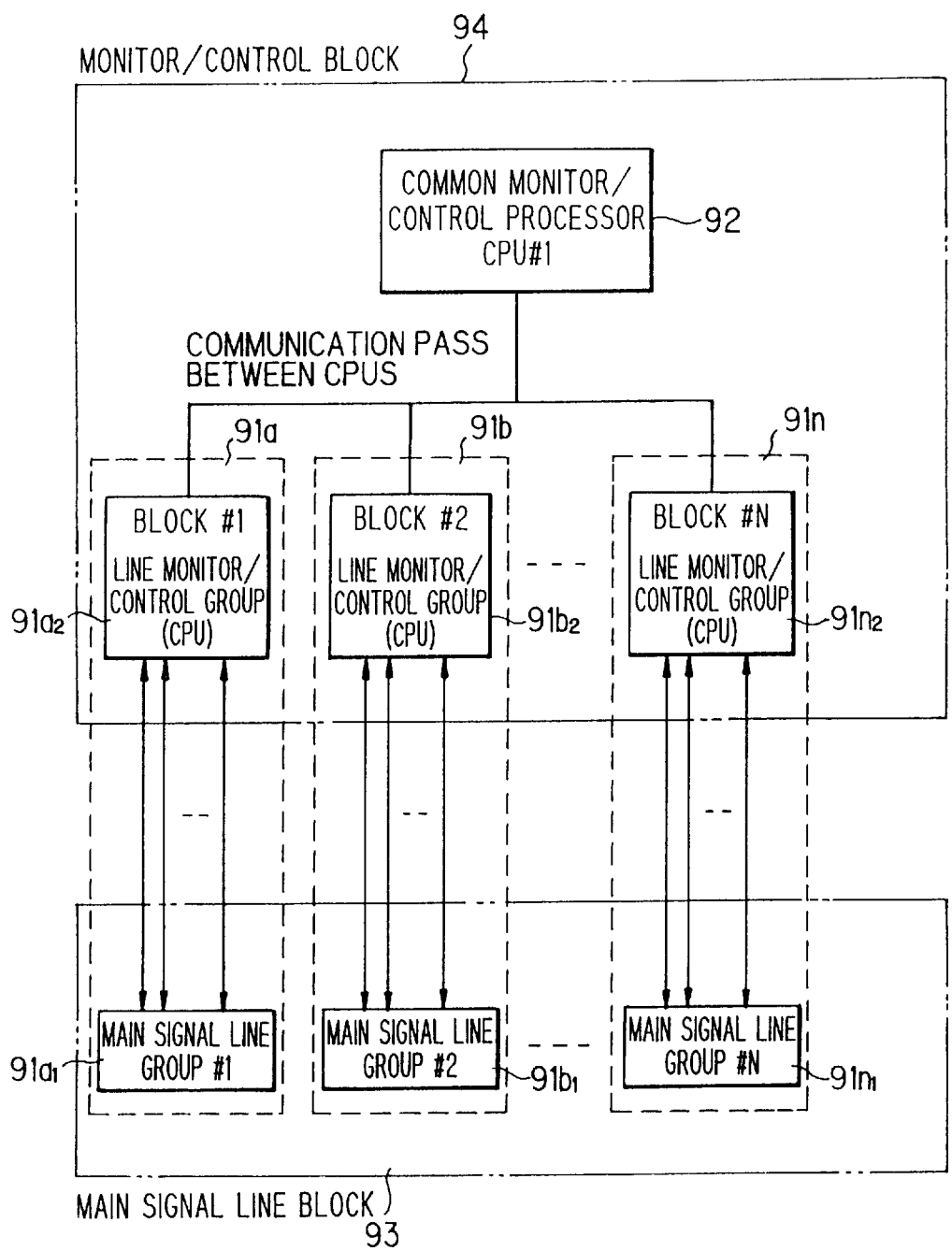
FIG. 31 is a block diagram of a transmission system explaining a conventional line switching information collection system.

FIG. 13 shows the structure of a shelf of a transmission apparatus according to the present invention. In FIG. 13A, the reference numeral 100 represents a main signal line block, 200 a monitor/control block, and 300 an ATM link. In FIG. 13B, the reference numeral 101*a* represents an ATM routing unit (HUB), and 102*a* a main signal line group. The main signal line group 102*a* includes optical line interface unit (RC), demultiplexer unit (DM), switch unit (MM), multiplexer unit (MX), optical line interface unit (TC), etc. The monitor/control block 200 includes memory unit (MEM), craft interface unit (CRF), DCC end terminal unit (DCC), alarm & order wire function unit (AWU), head unit (HED), and power unit (PW). The head unit (HED) executes polling control and overhead interface control. The head unit (HED) corresponds to the ATM polling portion 201 in FIGS. 1 and 6.

The main signal line block 100 and the monitor/control block 200 are simultaneously mounted on the shelf, but there is no connection on the back board except for the power source and the ground GRD. The ATM link 300 connects the ATM routing unit (HUB) 101*a* to the ATM polling portion (HED) 201 on the front surface of the shelf, and all the transmission and reception of the monitor/control/overhead information, etc, is executed via the ATM link 300.

As described above, according to the present invention, since it is possible to transmit line switching information to the monitor/control block via an ATM link at a high speed in the form of an ATM cell, even if the number of groups contained in the main signal line block or the number of units contained in the group increases, it is possible to prevent an increase in the number of signal lines, to prevent the back board from being layered and to improve the wiring operability. In addition, since the ATM polling portion of the monitor/control block collects line switching information by a hardware via an ATM link at a high speed, it is possible to lighten the burden of the software processing imposed on a processor of the monitor/control block, thereby enabling high-speed line switching processing by the processor.

According to the present invention, since the ATM mapping portion for generating an ATM cell by mapping line switching information in the data field of the ATM cell and transmitting the ATM cell to the ATM cell transmitter and receiver (ATM routing portion) is provided in the main signal line block, and the line switching information collecting portion transmits the collected line switching information to the ATM mapping portion as serial data, the ATM mapping portion can map the line switching information in the ATM cell at a high speed, thereby lightening the load of the processor.

According to the present invention, since a start bit, a stop bit and a parity bit are attached to an ATM cell, and the ATM cell is transmitted and received between the ATM mapping portion and the ATM cell transmitter and receiver (ATM routing portion) in start-stop synchronization, the correct transmission and reception of the ATM cell is enabled.

In addition, according to the present invention, since the monitor/control block transmits a polling cell having a VCI value which specifies a unit, the ATM routing portion of the main signal line block routes the received polling cell to the ATM mapping portion designated by the VCI value, and the ATM mapping portion transmits the information required by the polling cell to the monitor/control block in the form of an ATM cell via the ATM routing portion, it is possible to transmit and receive desired information (unit state data, unit identification data, line switching control data, etc.) between the monitor/control block and each unit via an ATM link.

Furthermore, according to the present invention, the monitor/control block can transmit a line switching control signal to a line switching unit via the ATM link in the form of an ATM cell, and the line switching unit can execute the switching between the working line and the protection line in accordance with the instruction of the control signal.

As many apparently widely different embodiments of the present invention can be made without departing from the spirit and scope thereof, it is to be understood that the invention is not limited to the specific embodiments thereof except as defined in the appended claims.

What is claimed is:

1. A transmission apparatus comprising:

a main signal line block for transmitting a main signal via lines and;

a monitor/control block for monitoring state of said apparatus and lines by collecting line switching information supplied from each unit which constitutes said main signal line block and controlling the switching operation between a working line and a protection line in said main signal line block; wherein said main signal line block and said monitor/control block are connected by an ATM link;

said main signal line block includes a line switching information collecting portion for collecting line switching information supplied from each unit, and an ATM cell transmitter/receiver for transmitting an ATM cell in which said line switching information is mapped to said monitor/control block via said ATM link and receiving an ATM cell which is transmitted from said monitor/control block;

said monitor/control block includes an ATM cell transmitter/receiver for receiving an ATM cell which is transmitted from said main signal line block and transmitting an ATM cell in which predetermined information is mapped to said main signal line block via said ATM link.

2. A transmission apparatus according to claim 1, wherein said main signal line block further includes an ATM mapping portion for generating an ATM cell by mapping said line switching information in a data field of said ATM cell and transmitting said ATM cell to the ATM cell transmitter/receiver in the main signal line block; and said line switching information collecting portion transmits the collected line switching information to said ATM mapping portion as serial data.

3. A transmission apparatus according to claim 1, wherein said monitor/control block transmits a polling cell which requires line switching information to said main signal line block via said ATM link; and said ATM cell transmitter/receiver of said main signal line block transmits said ATM cell in which said line switching information is mapped to said monitor/control block via said ATM link when said ATM cell transmitter/receiver receives said polling cell.

4. A transmission apparatus according to claim 2, wherein said ATM cell is transmitted and received between said ATM mapping portion and said ATM cell transmitter/receiver in accordance with start-stop synchronization by attaching a start bit, a stop bit and a parity bit to said ATM cell.

5. A transmission apparatus according to claim 2, wherein a predetermined unit is provided with said line switching information collecting portion, said ATM cell transmitter/receiver and said ATM mapping portion, and each of the other units is provided an ATM mapping portion for transmitting and receiving an ATM cell to and from said ATM cell transmitter/receiver; and said ATM cell transmitter/receiver of said monitor/control block transmits a polling cell having a VCI value corresponding to a unit to which said polling cell is transmitted to said main signal line block via the ATM link, said ATM cell transmitter/receiver of said main signal line block routes said polling cell to said ATM mapping portion of the unit which is designated by said VCI value, and said ATM mapping portion transmits said information required by said polling cell to said monitor/control block via said ATM cell transmitter/receiver of said main signal line block in the form of an ATM cell.

6. A transmission apparatus according to claim 5, wherein said predetermined unit is a line switching control unit; and said monitor/control block transmits a line switching control signal to said line switching control unit via said ATM link, and said line switching control unit executes switching between said working line and said protection line in accordance with the instruction of said control signal.

* * * * *